(12) United States Patent
Ogino

(10) Patent No.: US 10,992,855 B2
(45) Date of Patent: Apr. 27, 2021

(54) ELECTRONIC APPARATUS HAVING DISPLAY DEVICE, METHOD OF CONTROLLING SAME, AND STORAGE MEDIUM

(71) Applicant: CANON KABUSHIKI KAISHA, Tokyo (JP)

(72) Inventor: Mayuko Ogino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/508,663

(22) Filed: Jul. 11, 2019

(65) Prior Publication Data
US 2020/0029014 A1    Jan. 23, 2020

(30) Foreign Application Priority Data
Jul. 23, 2018    (JP) .............................. JP2018-137811

(51) Int. Cl.
  *H04N 5/225*    (2006.01)
  *H04N 5/232*    (2006.01)
(52) U.S. Cl.
  CPC ..... *H04N 5/23216* (2013.01); *H04N 5/23203* (2013.01); *H04N 5/23245* (2013.01); *H04N 5/23293* (2013.01)
(58) Field of Classification Search
  None
  See application file for complete search history.

(56) References Cited

U.S. PATENT DOCUMENTS

| | | | |
|---|---|---|---|
| 6,297,945 B1 * | 10/2001 | Yamamoto | G06F 1/1616 312/223.1 |
| 7,408,586 B2 | 8/2008 | Ueda et al. | |
| 7,646,421 B2 | 1/2010 | Ueda et al. | |
| 7,782,394 B2 | 8/2010 | Ueda et al. | |
| 7,787,045 B2 | 8/2010 | Ueda et al. | |
| 7,796,160 B2 | 9/2010 | Ueda et al. | |
| 8,111,323 B2 | 2/2012 | Ueda et al. | |
| 8,218,071 B2 | 7/2012 | Ueda et al. | |
| 8,223,263 B2 | 7/2012 | Ueda et al. | |
| 8,228,416 B2 | 7/2012 | Ueda et al. | |
| 8,264,596 B2 | 9/2012 | Ueda et al. | |
| 8,411,196 B2 | 4/2013 | Ueda et al. | |

(Continued)

FOREIGN PATENT DOCUMENTS

| | | |
|---|---|---|
| JP | 2005-114759 A | 4/2005 |
| JP | 2010-016896 A | 1/2010 |

*Primary Examiner* — Twyler L Haskins
*Assistant Examiner* — Dwight Alex C Tejano
(74) *Attorney, Agent, or Firm* — Venable LLP

(57) ABSTRACT

An electronic apparatus including a casing and a display device held on the casing at a holding position and including display sections each capable of independently displaying an image. The display sections include a first display section farthest from the holding position and at least one second display section including a display section held on the casing at the holding position. The display device is in one of a first state in which all angles each formed between adjacent display sections are larger than a first angle, a second state in which all the angles are smaller than a second angle smaller than the first angle, and a third state other than these states. When in the third state, an image is displayed on the first display section, and is not displayed on at least one of the second display sections.

11 Claims, 15 Drawing Sheets

(56) References Cited

U.S. PATENT DOCUMENTS

| | | |
|---|---|---|
| 8,970,759 B2 | 3/2015 | Ueda et al. |
| 9,071,747 B2 | 6/2015 | Ueda et al. |
| 2006/0256033 A1* | 11/2006 | Chan ............... G09G 5/395 345/1.1 |
| 2007/0126910 A1* | 6/2007 | Misawa ............. H04N 5/2251 348/333.01 |
| 2007/0153112 A1 | 7/2007 | Ueda et al. |
| 2007/0153113 A1 | 7/2007 | Ueda et al. |
| 2007/0153114 A1 | 7/2007 | Ueda et al. |
| 2008/0068490 A1 | 3/2008 | Ueda et al. |
| 2008/0231740 A1* | 9/2008 | McIntyre ....... H04N 5/232935 348/333.01 |
| 2009/0303374 A1 | 12/2009 | Ueda et al. |
| 2009/0310012 A1 | 12/2009 | Ueda et al. |
| 2010/0066845 A1 | 3/2010 | Ueda et al. |
| 2010/0201604 A1* | 8/2010 | Kee ................. G06F 1/1641 345/1.3 |
| 2010/0265379 A1 | 10/2010 | Ueda et al. |
| 2010/0271530 A1 | 10/2010 | Ueda et al. |
| 2010/0271531 A1 | 10/2010 | Ueda et al. |
| 2010/0271532 A1 | 10/2010 | Ueda et al. |
| 2010/0295955 A1 | 11/2010 | Ueda et al. |
| 2010/0302411 A1 | 12/2010 | Ueda et al. |
| 2011/0216064 A1* | 9/2011 | Dahl ................ G06F 1/1677 345/428 |
| 2011/0267528 A1 | 11/2011 | Ueda et al. |
| 2012/0081593 A1* | 4/2012 | Nakagawa ......... H04N 5/2251 348/333.06 |
| 2013/0088611 A1 | 4/2013 | Ueda et al. |
| 2014/0028889 A1 | 1/2014 | Ueda et al. |
| 2014/0028890 A1 | 1/2014 | Ueda et al. |
| 2014/0160233 A1* | 6/2014 | Ishida ............... H04N 5/2628 348/36 |
| 2015/0035777 A1* | 2/2015 | Hirakata ............ G06F 3/041 345/173 |
| 2015/0350555 A1* | 12/2015 | Nishi ................. H04N 5/341 348/333.02 |
| 2016/0057358 A1* | 2/2016 | Yamamoto ....... H04N 5/23293 348/333.06 |

\* cited by examiner

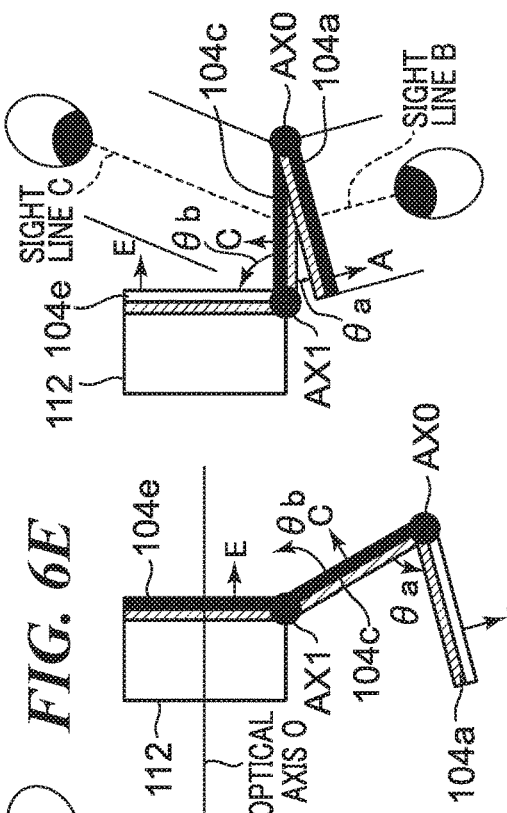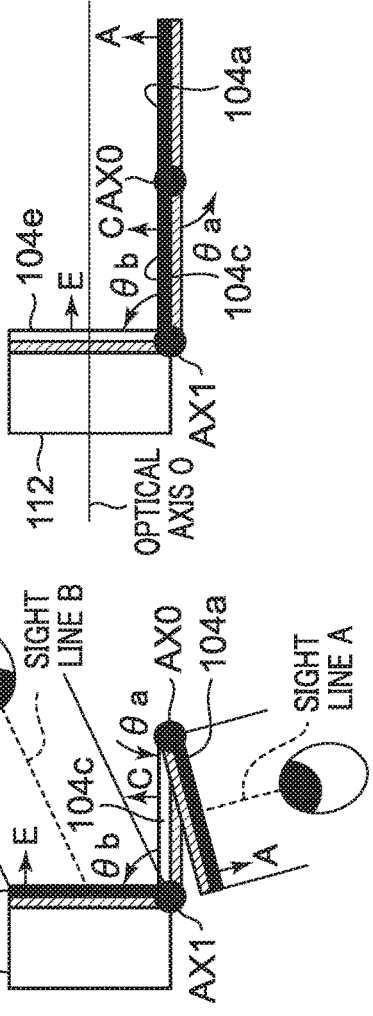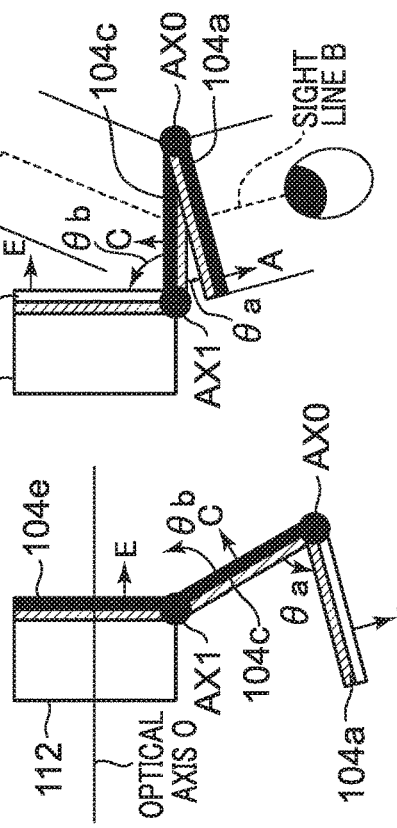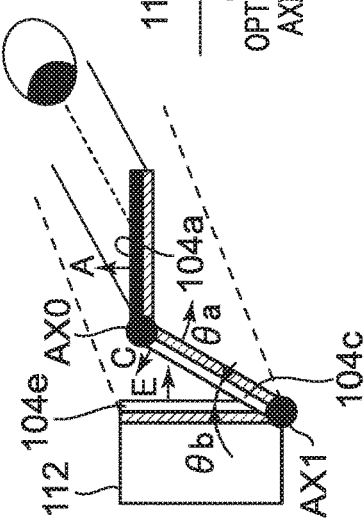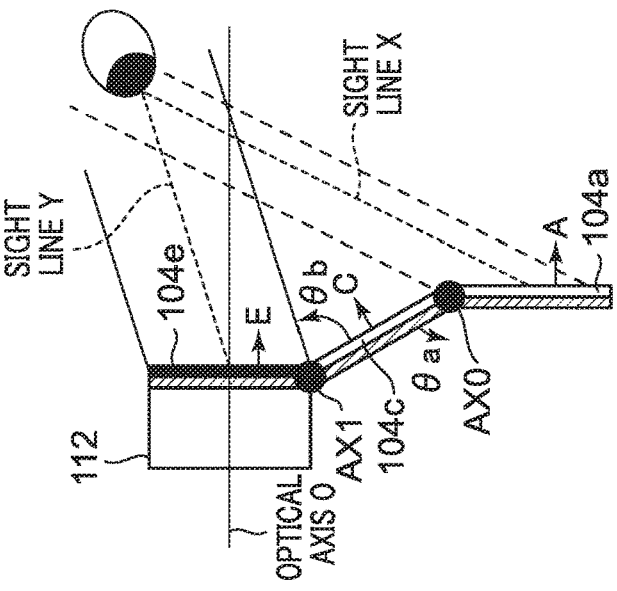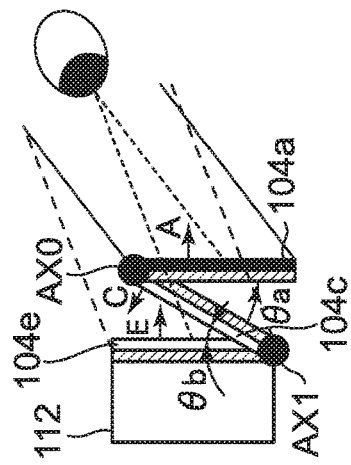

FIG. 9
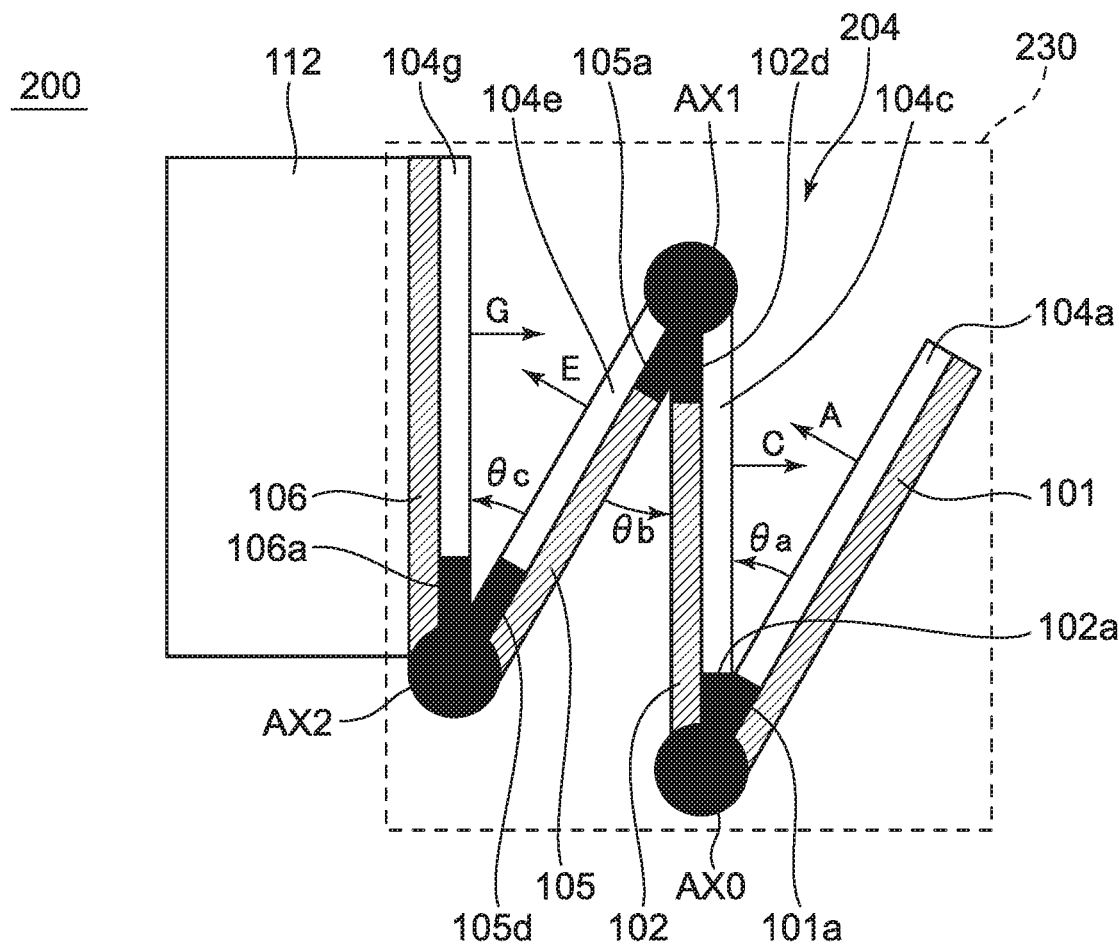
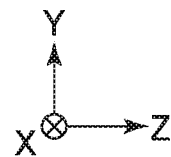

ELECTRONIC APPARATUS HAVING DISPLAY DEVICE, METHOD OF CONTROLLING SAME, AND STORAGE MEDIUM

BACKGROUND OF THE INVENTION

Field of the Invention

The present invention relates to an electronic apparatus having a display device including a plurality of display sections each capable of independently displaying an image, a method of controlling the same, and a storage medium.

Description of the Related Art

Conventionally, there has been known an electronic apparatus that enables a user to view an image from various angles of line of sight by switching a display state of a display section according to an opening angle or an unfolded state of the display section. Japanese Laid-Open Patent Publication (Kokai) No. 2010-16896 discloses a so-called variable-angle monitor that shifts a display section formed by one screen and rotatably held with respect to the self-apparatus, to various angles, to thereby enable a user to view the display section from a desired angle. According to this technique, display control for shifting the apparatus to a live view mode in which images are sequentially displayed is realized through detection of an operation for rotating the display section.

Further, Japanese Laid-Open Patent Publication (Kokai) No. 2005-114759 discloses an electronic apparatus (mobile phone) including a flexible display that is supported on a plurality of supporting members connected by hinges and is placed in an unfolded state and a folded state by rotation of the hinges, thereby achieving both of size reduction of the apparatus and enlargement of the display range. According to this technique, it is considered that the use of a bendable device enables achieving both of enlargement of the display area and size reduction of the apparatus.

However, the electronic apparatuses disclosed in Japanese Laid-Open Patent Publication (Kokai) No. 2010-16896 and Japanese Laid-Open Patent Publication (Kokai) No. 2005-114759 have only one screen, and hence there is little room for improvement of viewability. Further, in Japanese Laid-Open Patent Publication (Kokai) No. 2005-114759, an image is displayed on the display area increased in size, which causes an increase in power consumption. Therefore, assuming that the electronic apparatus is provided with a plurality of display sections, it is difficult to simultaneously meet the requirements of preventing increase in the size of the apparatus, improving viewability of an image, and suppressing increase in power consumption.

SUMMARY OF THE INVENTION

The present invention provides an electronic apparatus that has a display device and suppresses power consumption while achieving both of size reduction of the apparatus and improvement of viewability of an image.

In a first aspect of the present invention, there is provided an electronic apparatus comprising a casing, a display device held on the casing at a holding position and including a plurality of display sections each of which is capable of independently displaying an image, and at least one processor or circuit configured to perform the operations of the following unit: a control unit configured to control display on the display device, wherein the display device is configured such that an angle formed between each adjacent ones of the display sections is variable, wherein the plurality of display sections include a first display section farthest from the holding position and at least one second display section including a display section held on the casing at the holding position, wherein possible states of the display device include a first state in which all of angles each formed between adjacent ones of the display sections are larger than a first angle, a second state in which all of the angles each formed between the adjacent ones of the display sections are smaller than a second angle which is smaller than the first angle, and a third state in which the display device is neither in the first state nor in the second state, and wherein when the display device is in the third state, the control unit causes an image to be displayed on the first display section and no image to be displayed on at least one of the at least one second display section.

In a second aspect of the present invention, there is provided a method of controlling an electronic apparatus including a casing, and a display device held on the casing at a holding position and including a plurality of display sections each of which is capable of independently displaying an image, wherein the display device is configured such that an angle formed between display surfaces of each adjacent ones of the display sections is variable, wherein the plurality of display sections include a first display section farthest from the holding position and at least one second display section including a display section held on the casing at the holding position, and wherein possible states of the display device include a first state in which all of angles each formed between display surfaces of each adjacent ones of the display sections are larger than a first angle, a second state in which all of the angles each formed between the display surfaces of each adjacent ones of the display sections are smaller than a second angle which is smaller than the first angle, and a third state in which the display device is neither in the first state nor in the second state, the method comprising causing, when the display device is in the third state, an image to be displayed on the first display section and no image to be displayed on at least one of the at least one second display section.

In a third aspect of the present invention, there is provided a non-transitory computer-readable storage medium storing a computer-executable program for executing a method of controlling an electronic apparatus including a casing, and a display device held on the casing at a holding position and including a plurality of display sections each of which is capable of independently displaying an image, wherein the display device is configured such that an angle formed between display surfaces of each adjacent ones of the display sections is variable, wherein the plurality of display sections include a first display section farthest from the holding position and at least one second display section including a display section held on the casing at the holding position, and wherein possible states of the display device include a first state in which all of angles each formed between display surfaces of each adjacent ones of the display sections are larger than a first angle, a second state in which all of the angles each formed between the display surfaces of each adjacent ones of the display sections are smaller than a second angle which is smaller than the first angle, and a third state in which the display device is neither in the first state nor in the second state, wherein the method comprises causing, when the display device is in the third state, an image to be displayed on the first display section and no image to be displayed on at least one of the at least one second display section.

According to the present invention, it is possible to suppress power consumption while achieving both of size reduction of the apparatus and improvement of viewability of an image.

Further features of the present invention will become apparent from the following description of exemplary embodiments (with reference to the attached drawings).

BRIEF DESCRIPTION OF THE DRAWINGS

FIGS. 6A to 6G are schematic side views of the electronic apparatus.

FIG. 9 is a schematic side view of an electronic apparatus according to a second embodiment of the present invention.

DESCRIPTION OF THE EMBODIMENTS

The present invention will now be described in detail below with reference to the accompanying drawings showing embodiments thereof.

Figure 1B:
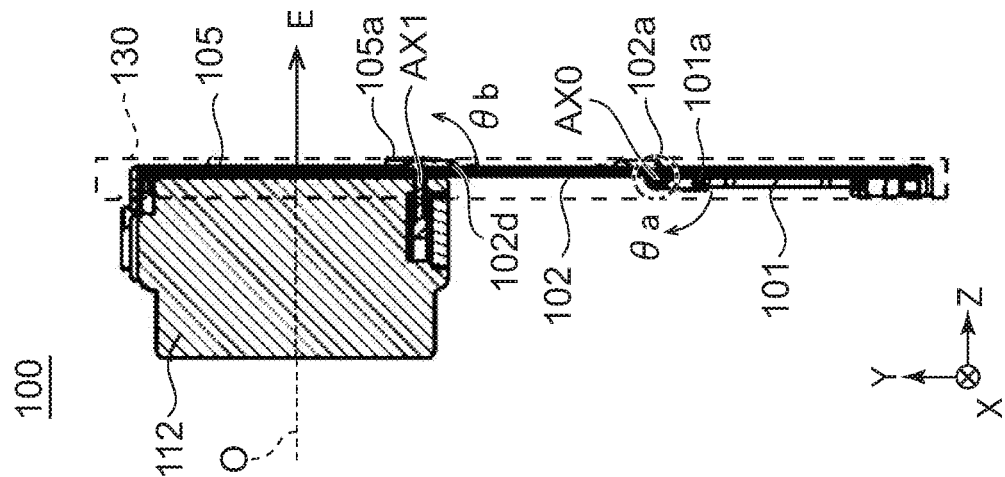
FIG. 1B is a cross-sectional view taken along A-A in FIG. 1A.
Figure 1A:
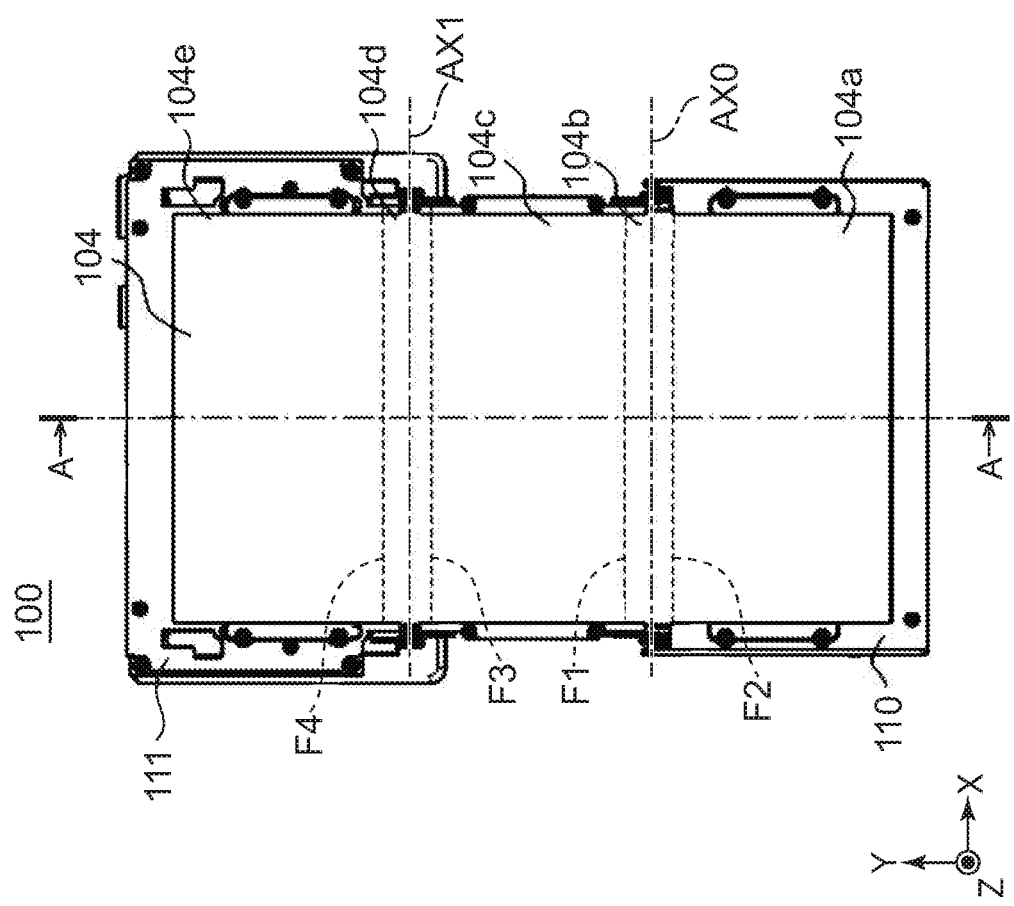
FIG. 1A is a front view of an electronic apparatus according to a first embodiment of the present invention.

FIG. 1A is a front view of an electronic apparatus according to a first embodiment of the present invention. FIG. 1B is a cross-sectional view taken along A-A in FIG. 1A. This electronic apparatus, denoted by reference numeral 100, includes a camera body 112 also serving as a casing, and a display device 130. The display device 130 is part surrounded by broken lines in FIG. 1B. The camera body 112 has an image pickup section including an image pickup device 6 and a lens unit 4 (see FIG. 4), described hereinafter, and is capable of picking up an image of a subject existing in a direction of an optical axis O (image pickup optical axis). Hereafter, the directions of the electronic apparatus 100 are referred to based on XYZ coordinate axes. The A-A line is parallel to a Y direction. The optical axis O is substantially parallel to a Z direction. For convenience of explanation, a side of the electronic apparatus 100 on which the display device 130 is provided (+Z direction) is referred to as the front side, and a side of the same toward the subject (−Z direction) is referred to as the rear side.

First, the construction of the display device 130 will be described. The display device 130 includes a first panel 101, a second panel 102, and a third panel 105, which are all formed of metal, such as stainless steel, and have a rectangular flat plate shape. The first panel 101 has hinge portions 101a arranged at opposite ends of one side parallel to the X-axis. Further, the second panel 102 has hinge portions 102a arranged at opposite ends of one side parallel to the X-axis. The hinge portions 101a and the hinge portions 102a are rotatably connected about a rotational axis AX0 which is parallel to the X-axis. With this, the first panel 101 and the second panel 102 can be rotated about the rotational axis AX0 relative to each other. The hinge portions 101a and the hinge portions 102a are collectively referred to as the "first hinge". A rotational angle of a display section, referred to hereinafter, including the first panel 101, with respect to a display section, referred to hereinafter, including the second panel 102, in a folding direction, is represented by θa. The angle θa can take a range of values from at least 0 to 180°, and in FIGS. 1A and 1B, θa=180° holds.

The second panel 102 has hinge potions 102d arranged at opposite ends of one side parallel to the X-axis, which is opposite to the side provided with the hinge portions 102a. Further, the third panel 105 has hinge portions 105a arranged at opposite ends of one side parallel to the X-axis. The hinge portions 102d and the hinge portions 105a are rotatably connected about a rotational axis AX1 which is parallel to the X-axis. With this, the second panel 102 and the third panel 105 can be rotated about the rotational axis AX1 relative to each other. The hinge portions 102d and the hinge portions 105a are collectively referred to as the "second hinge". A rotational angle of the display section including the second panel 102 with respect to a display section, referred to hereinafter, including the third panel 105, in a folding direction, is represented by θb. The angle θb can take a range of values from at least 0 to 180°, and in FIGS. 1A and 1B, θb=180° holds.

Thus, the display device 130 has the first panel 101, the second panel 102, the third panel 105, the first hinge including the hinge portions 101a and 102a rotatable about the rotational axis AX0, and the second hinge including the hinge portions 102d and 105a rotatable about the rotational axis AX1.

A display 104 is a rectangular thin film-type display formed by an organic EL and has flexibility in at least part thereof. One surface of the display 104 forms a display surface on which displayed contents can be changed as desired. An electrostatic capacitance type touch panel is incorporated in this display surface and a user can perform various operations by touching the display with a finger or the like. Three double-sided tapes, not shown, for being fixed to respective members are affixed to the other surface of the display 104 opposite to the display surface.

The display 104 is divided into virtual five parts by boundary lines F1 to F4 parallel to the X-axis. In the state shown in FIG. 1A, the boundary lines F2, F1, F3, and F4 are located in the mentioned order in the Y direction, and the five parts are sequentially a first flat part 104a, a first bending part 104b, a second flat part 104c, a second bending part 104d, and a third flat part 104e. The first flat part 104a, the second flat part 104c, and the third flat part 104e are respective portions of a plurality of display sections, each having a function of displaying an image. Each of the plurality of display sections can independently display an image. A reverse side of the first flat part 104a is affixed to the first panel 101, a reverse side of the second flat part 104c is affixed to the second panel 102, and a reverse side of the third flat part 104e is affixed to the third panel 105. The first panel 101, the second panel 102, and the third panel 105, and the first flat part 104a, the second flat part 104c, and the third flat part 104e respectively affixed to these panels 101, 102, and 105 form the plurality of display sections, respectively. That is, each panel and an associated flat part affixed thereto form a display section. This also applies to the other embodiments described hereinafter.

One of front and reverse surfaces of each of the first panel 101, the second panel 102, and the third panel 105, which is oriented in a +Z direction (E direction normal to the display surface of the third flat part 104e, referred to hereinafter) in the state shown in FIGS. 1A and 1B, in which $\theta a=\theta b=180°$ holds, is referred to as the first surface, and a surface opposite to the first surface is referred to as the second surface. In the present embodiment, all of the first surfaces of the panels 101, 102, and 105 are the display surfaces which can display an image (in a strict sense, the surfaces corresponding to the display surface of the display 104). The above-mentioned angles $\theta a$ and $\theta b$ each correspond to an angle formed in a folding direction between adjacent ones of the display sections including the respective associated panels. The state shown in FIGS. 1A and 1B is included in an unfolded state, referred to hereinafter. In the state shown in FIGS. 1A and 1B, the first surfaces of the panels 101, 102, and 105 are parallel to each other, and are oriented in the same direction. The rotational axis AX0 of the first hinge and the rotational axis AX1 of the second hinge are always orthogonal to lines normal to the respective first surfaces of the panels 101, 102, and 105. Note that angles referred to hereinafter between adjacent display sections other than the angles $\theta a$ and $\theta b$ are each also measured in a closing direction.

Note that the first and second hinges may have another structure insofar as the structure makes variable the angles between the display sections including the first flat part 104a, the second flat part 104c, and the third flat part 104e, respectively. For example, the panels may be rotatably connected via bending portions having elasticity. Note that the first flat part 104a, the second flat part 104c, and the third flat part 104e are not necessarily required to be continuously arranged. That is, it is only required to make variable the angles formed between the display sections adjacent to each other. Therefore, for example, the first flat part, the second flat part, and the third flat part may be separate displays without the first and second bending parts.

Figure 2A:
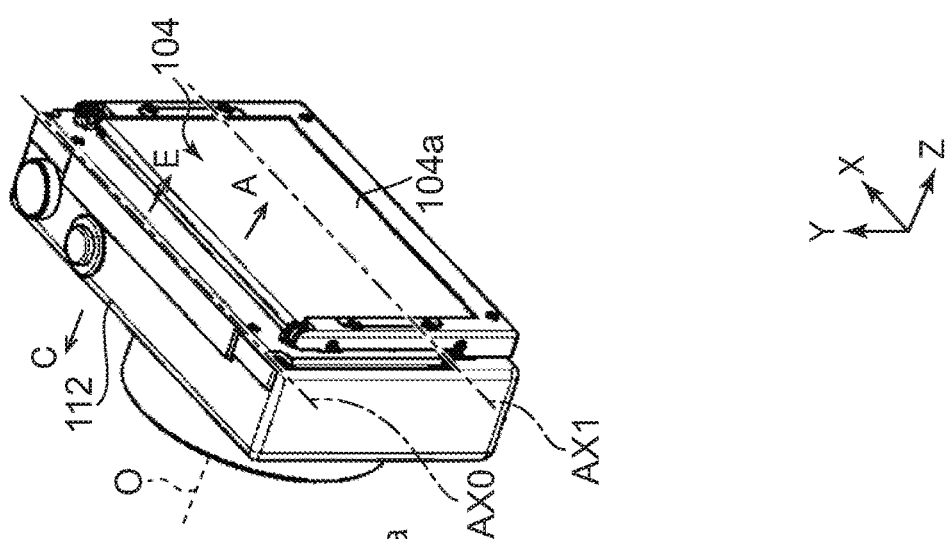
FIGS. 2A to 2C are perspective views of the electronic apparatus.
Figure 2B:
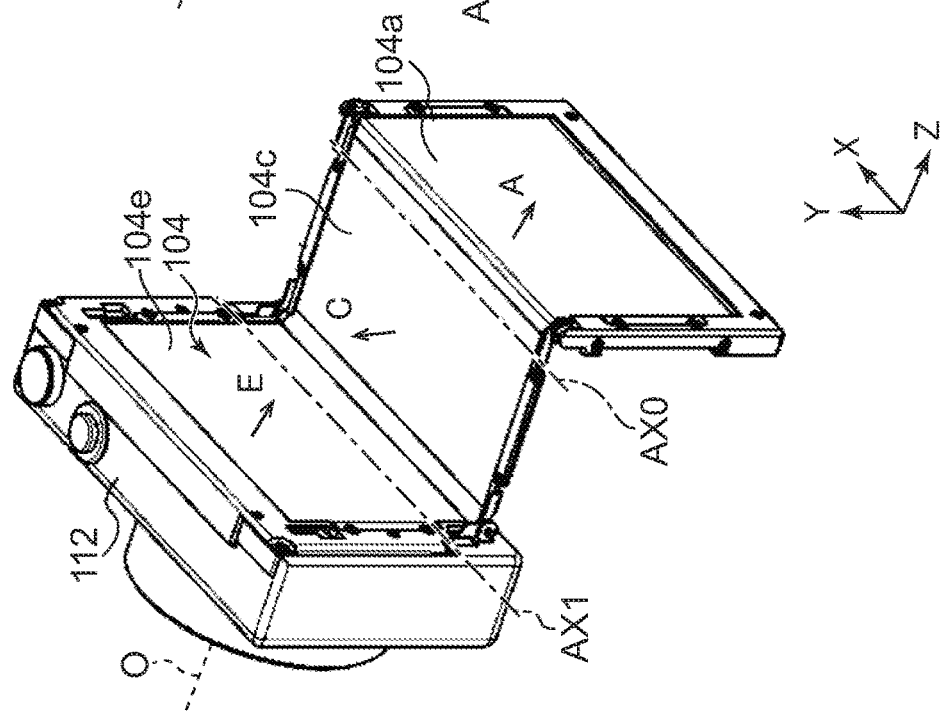
Figure 2C:
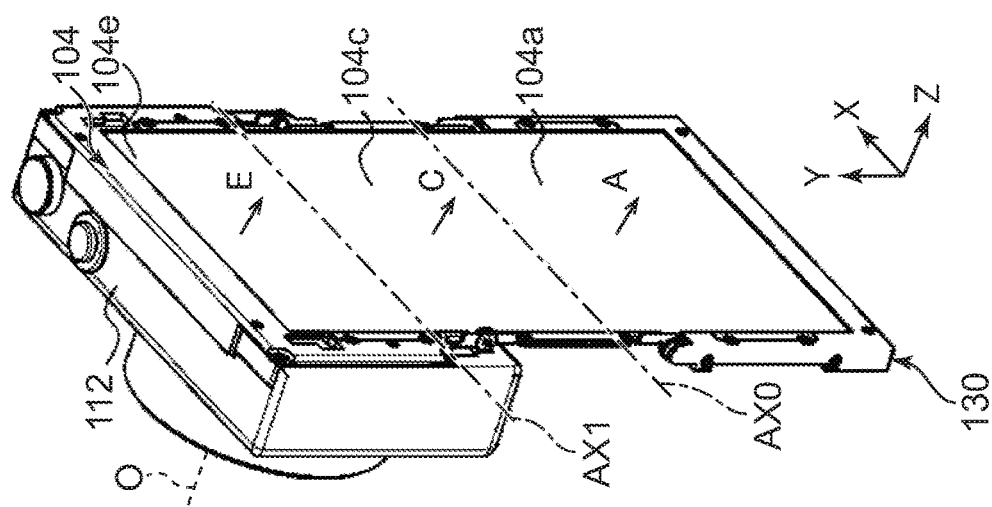

Next, the rotational operation of the panels using the first and second hinges will be described. FIGS. 2A to 2C are perspective views of the electronic apparatus 100 in respective states caused by rotation of the first and second hinges. FIGS. 2A, 2B, and 2C show cases where $\theta a=\theta b=180°$, $90°$, and $0°$ hold, respectively. Directions normal to the display surface of the first flat part 104a, the display surface of the second flat part 104c, and the display surface of the third flat part 104e are indicated by A, C, and E, respectively.

The display device 130 is held on the camera body 112 at the rear surface of the display device 130 with four screws. Here, the rear surface of the display device 130 refers to the second surface, opposite to the first surface, of the third panel 105. The second surface of the third panel 105 forms a holding portion (defines a holding position) where the display device 130 is held on the camera body 112. The third panel 105 is fixed to the camera body 112 and hence the E direction normal to the display surface of the third flat part 104e fixed to the third panel 105 is always the same as the +Z direction (direction opposite to an image pickup direction of the image pickup section of the camera body 112). The first flat part 104a belongs to a display section farthest (most away) from the holding portion.

FIGS. 2A, 2B, and 2C show respective examples of the unfolded state (first state), an intermediate state (third state), and a folded state (second state). The intermediate state is a state which corresponds neither to the unfolded state nor to the folded state. The definitions of the unfolded state, the intermediate state, and the folded state, and how each flat part rotates will be described with reference to FIGS. 3A to 3E.

FIGS. 3A to 3E are schematic side views of the electronic apparatus 100. In each view, black part in the first flat part 104a, the second flat part 104c, and the third flat part 104e indicates a state in which an image is being displayed, whereas white part in the same indicates a state in which no image is being displayed.

In the present embodiment, a state in which the angle $\theta a$ and the angle $\theta b$ are both larger than a first angle $\theta 1$ is defined as the "unfolded state" of the display device 130. It is desirable that the first angle $\theta 1$ is not smaller than 90°, and in the present embodiment, the first angle $\theta 1$ is set to 160°, by way of example. Further, a state in which the angle $\theta a$ and the angle $\theta b$ are both smaller than a second angle $\theta 2$ is defined as the "folded state" of the display device 130. It is desired that the second angle $\theta 2$ is smaller than 90°, and in the present embodiment, the first angle $\theta 2$ is set to 30°, by way of example. Note that $\theta 2 < \theta 1$ holds.

Figure 3A:
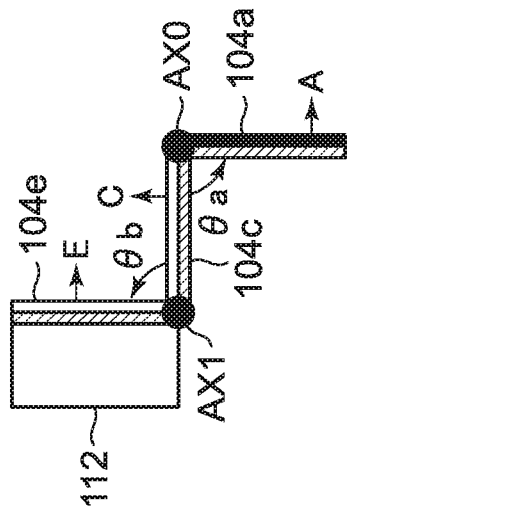
FIGS. 3A to 3E are schematic side views of the electronic apparatus.
Figure 3B:
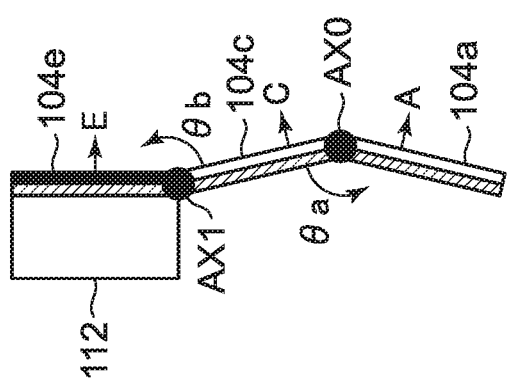

The state shown in FIG. 3A is the unfolded state in which $\theta a=\theta b=180°$ holds, and the A direction, the C direction, and the E direction all correspond to the +Z direction. More specifically, the display 104 is unfolded such that the first flat part 104a, the second flat part 104c, and the third flat part 104e are parallel to each other, and the display surfaces are oriented in the same direction. In the unfolded state, it is possible to make the display area larger, which is displayed toward the +Z direction, and viewability (visibility) of an image and character information displayed on the display surface is high. For example, a live view image acquired by the image pickup section can be displayed on at least one of the flat parts 104a, 104c, and 104e. FIG. 3B also shows the unfolded state. The reason for why the first angle $\theta 1$ is not smaller than 90° is that when the display device 130 is viewed from a direction facing any of the flat parts, it is possible to visually recognize all of the flat parts 104a, 104c, and 104e.

When the hinges are rotated from the unfolded state shown in FIG. 3B, the first bending part 104b and the second bending part 104d are bent in accordance with rotation of the hinges, whereby the display 104 is going to be folded. From the unfolded state shown in FIG. 3B, as the display section including the second flat part 104c is rotated about the rotational axis AX1, and the display section including the first flat part 104a is rotated about the rotational axis AX0, the display device 130 is shifted to the intermediate state shown in FIG. 3C. The state shown in FIG. 3C is the intermediate state in which $\theta a=\theta b=90°$ holds, and the C direction corresponds to a +Y direction, and the A direction and the E direction correspond to the +Z direction.

Figure 3C:
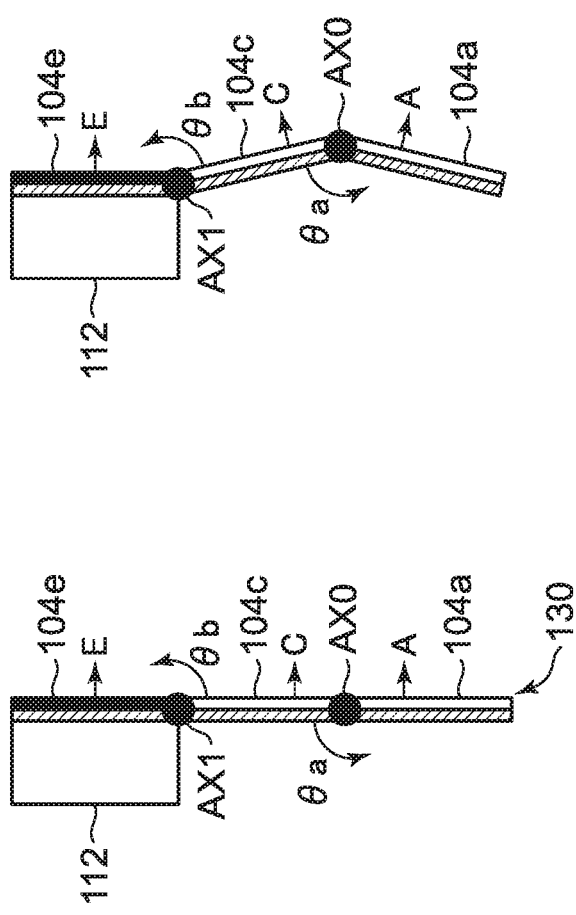
Figure 3D:
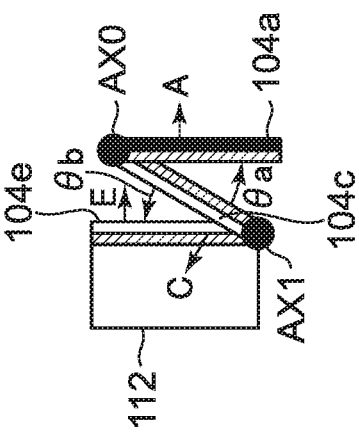

When the hinges are further rotated from the intermediate state shown in FIG. 3C, the display device 130 is eventually shifted to the folded state shown in FIG. 3D. The state shown in FIG. 3D is the folded state in which $\theta a=\theta b=0°$ holds, and the C direction corresponds to the −Z direction, and the A direction and the E direction correspond to the +Z direction. In other words, the state shown in FIG. 3D is a state in which the second surface of the first panel 101 and the second surface of the second panel 102 are opposed to each other substantially in parallel, and the first surface of the second panel 102 and the first surface of the third panel 105 are opposed to each other substantially in parallel. By folding the display 104 as described above, it is possible to reduce the dimension of the display device 130 in the Z direction in the folded state, and the portability of the electronic apparatus 100 is increased.

Figure 3E:
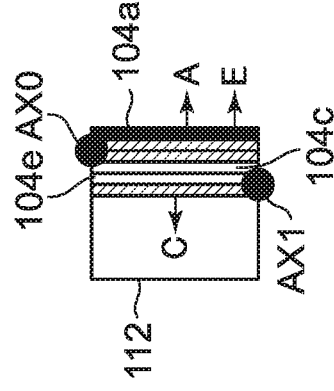

The state shown in FIG. 3E before reaching the state in which θa=θb=0° holds is also included in the folded state. It is desirable that the second angle θ2 is smaller than 90° because this causes all of the flat parts 104a, 104c, and 104e to overlap, as viewed in the Z direction (in the optical axis direction). That is, the display 104 with the overlapping flat parts is low in viewability and is not necessarily required to display an image, and hence it is possible to save electric power, and further, the dimension of the electronic apparatus 100 in the Z direction is small enough to make the portability of the electronic apparatus 100 high. Therefore, in the folded state, the electronic apparatus 100 is high in portability and saves power Thus, the electronic apparatus 100 can be shifted to the folded state and the unfolded state by rotation of the hinges, and by switching between the folded state in which the apparatus size is made small and the unfolded state in which the display area is made large, it is possible to achieve both portability and viewability.

Figure 4:
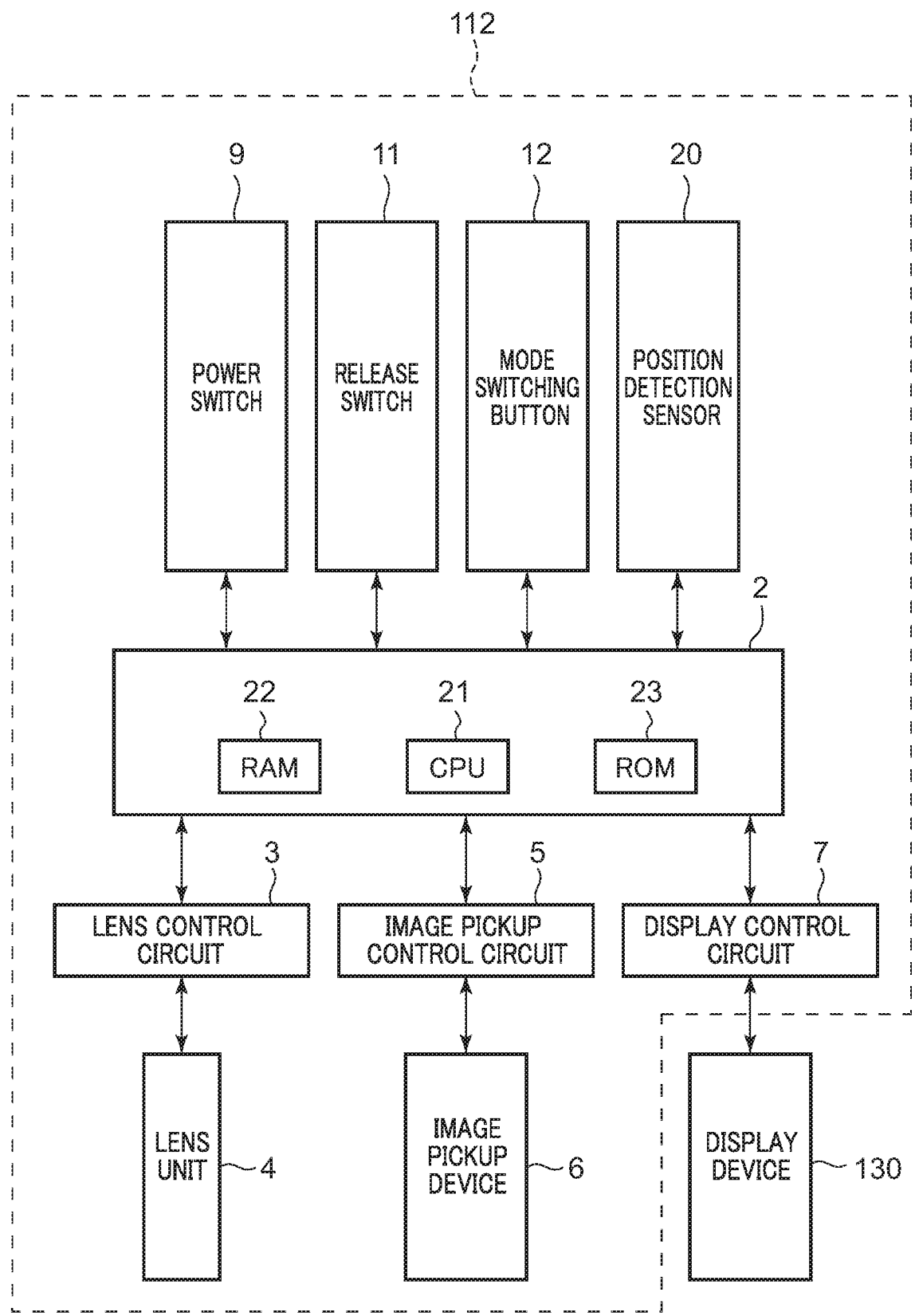
FIG. 4 is a block diagram of the electronic apparatus.

FIG. 4 is a block diagram of the electronic apparatus 100. A controller 2 performs centralized control of the operations of the electronic apparatus 100. The controller 2 includes a CPU 21 as a control unit, a RAM 22, and a ROM 23. The ROM 23 stores programs executed by the CPU 21. The RAM 22 is used as a work area when the CPU 21 executes the programs. The operations of the components of the electronic apparatus 100 are controlled according to instructions from the CPU 21.

A lens control circuit 3 controls driving of a zoom lens, a focus lens, a diaphragm, and so forth, none of which are shown, of the lens unit 4. Note that although the lens unit 4 is provided integrally with the camera body 112, the lens unit 4 may be configured to be removably mounted on the camera body 112. In the present embodiment, the image pickup section is formed by a combination of the lens unit 4 and the image pickup device 6.

The image pickup device 6 is a charge accumulation-type image pickup device, such as a CMOS sensor. The image pickup device 6 outputs analog image data by photoelectrically converting an optical flux (optical image of a subject) entering through the lens unit 4. An image pickup control circuit 5 controls the operation of the image pickup device 6 and driving of a shutter, not shown. The image pickup control circuit 5 controls charge accumulation time of the image pickup device 6 and readout of accumulated charges.

A power switch 9 is for instructing on/off of the power of the electronic apparatus 100. When the power switch 9 is turned on, electric power is supplied to the components of the electronic apparatus 100. A release switch 11 is operated to use the electronic apparatus 100 including the image pickup section as an image pickup apparatus. The release switch 11 is for instructing the image pickup section to photograph a still image. When the release switch 11 is turned on, the shutter of the image pickup section is released.

A mode switching button 12 is for switching a display mode of the first flat part 104a, the second flat part 104c, and the third flat part 104e. There are a plurality of display modes which are associated with uses of the electronic apparatus 100, respectively. For example, there is a live view mode for displaying a live view during image pickup when the electronic apparatus 100 is used as the image pickup apparatus, and further, there are a mode for displaying images photographed in the past and a mode for displaying various information in other cases than when or during image pickup. The controller 2 switches the display mode according to a user's operation of the mode switching button 12.

A position detection sensor 20 is a detection unit which is realized by an angle sensor for detecting a rotational angle of each hinge. The position detection sensor 20 detects relative positions of the first flat part 104a, the second flat part 104c, and the third flat part 104e of the display device 130. Note that the configuration of the position detection sensor 20 is not limited insofar as it can detect an angle formed between the adjacent display sections, and further, the position detection sensor 20 may be configured to detect a position of each display section with respect to the camera body 112.

The CPU 21 performs control for displaying an image on the first flat part 104a, the second flat part 104c, and the third flat part 104e via a display control circuit 7. The CPU 21 determines a flat part or flat parts on which an image is to be displayed based on the relative positions of the flat parts, detected by the position detection sensor 20. The CPU 21 identifies the current mode according to the operation of the mode switching button 12 and causes an image to be displayed on the flat part(s) according to the identified mode.

Next, a relationship between the rotation state of each flat part (display section) of the display device 130 and display thereon will be described with reference to FIGS. 5A to 5E, and 6A to 6G. FIGS. 5A to 5E are schematic views each showing an example of the display on the flat parts 104a, 104c, and 104e. FIGS. 6A to 6G are schematic side views of the electronic apparatus 100. In FIGS. 6A to 6G, each flat part in black indicates that an image is being displayed thereon, and each flat part in white indicates that no image is being displayed thereon.

First, in addition to the above-mentioned first angle θ1 (160°) and second angle θ2 (30°), a third angle θ3 and a fourth angle θ4 are defined. It is desirable that the third angle θ3 is not smaller than 60° and the fourth angle θ4 is not smaller than 90°. The reason why it is desirable that the third angle θ3 is not smaller than 60° will be described hereinafter with reference to FIG. 8.

Figure 5A:
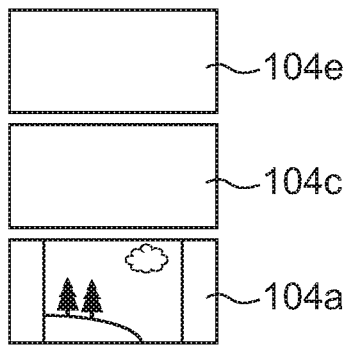
FIGS. 5A to 5E are schematic views each showing an example of display on flat parts.
Figure 5D:
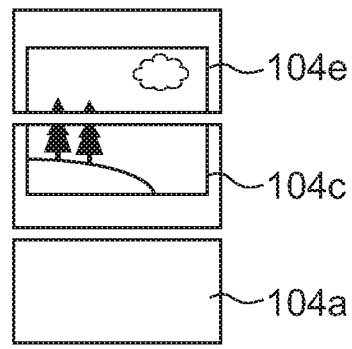

In the present embodiment, θ3=130° and θ4=90° are defined by way of example. The following description is given of conditions each required to be satisfied for display on a flat part associated therewith, except cases where an instruction is received from a user. As a matter of principle, the CPU 21 performs the display control as described below:

In the folded state, an image is displayed on the first flat part 104a of the farthest display section from the holding portion and no image is displayed on the other flat parts (see FIG. 5A). In this case, a condition that the display surface of the flat part of the display section farthest from the holding portion (the first flat part 104a) can be visually recognized, as viewed from the front of the display surface of the third flat part 104e along the E direction normal to the display surface of the third flat part 104e of the display section held at the holding portion, may be set as a condition required to be satisfied for display on the first flat part 104a. In the present embodiment, this condition is applied, and is satisfied in the folded state of the display device 130. In the unfolded state, an image is displayed on the third flat part 104e of the display section held on the holding portion of the camera body 112, and no image is displayed on the other flat parts (see FIG. 5B). In the intermediate state, an image is displayed on the first flat part 104a, and no image is displayed on at least one of the flat parts other than the first flat part 104a. For example, no image is displayed on all of the other flat parts (see FIG. 5A).

However, even when the display device 130 is in the intermediate state, in a case where the pairs of the adjacent display sections include one which form an angle larger than the third angle θ3, an image is displayed on the flat parts of the display sections forming the pair. In the present embodiment, the pair of the display section including the first flat part 104a and the display section including the second flat part 104c form the angle θa, and the pair of the display section including the second flat part 104c and the display section including the third flat part 104e form the angle θb. Therefore, in a case where at least one of the angle θa and the angle θb is larger than the third angle θ3, an image is displayed over the successive display areas (see FIGS. 5D, 5E, 6E, and 6F). In this case, the CPU 21 does not display an image on the flat part other than the flat parts of the display sections forming the pair. Note that in a case where a setting of display is made such that an image is displayed on the third flat part 104e, this setting may be held.

Figure 5B:
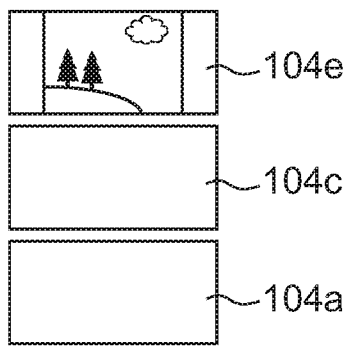
Figure 5E:
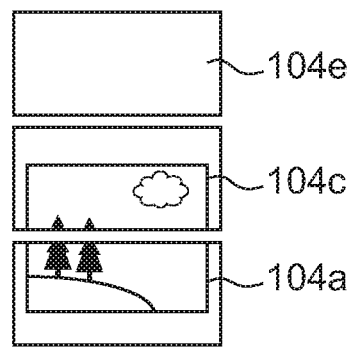
Figure 5C:
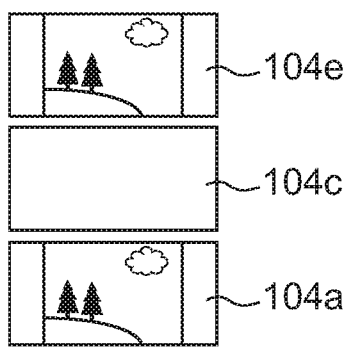

Further, even when the display device 130 is in the intermediate state, in a case where the angle θb formed between the display section including the third flat part 104e, which is held on the holding portion of the camera body 112, and the display section including the second flat part 104c, which is adjacent to the display section including the third flat panel 104e, is larger than the fourth angle θ4, an image is also displayed on the third flat part 104e. That is, in a case where θb>θ4 holds, the display state is as shown in FIG. 5C and in 6D. The display state will be further described based on specific examples with reference to FIGS. 5A to 5E and 6A to 6G.

A state shown in FIG. 6A is the folded state in which θa=θb=25° holds, and a state shown in FIG. 6C is the intermediate state in which θa=100° and θb=30° hold. It is considered that display device 130 is in the intermediate state shown in FIG. 6C when photographing or picking up an image of a subject existing in a position lower than line of sight. In the folded state as shown in FIG. 6A or in the intermediate state as shown in FIG. 6C, an image is displayed on the first flat part 104a which is the farthest display area from the holding portion (see FIG. 5A). However, no image is displayed on the second flat part 104c and the third flat part 104e. This is because in the folded state shown in FIG. 6A, the second flat part 104c and the third flat part 104e are blocked by the first flat part 104a from being viewed, and hence it is difficult to view the flat parts 104c and 104e. Further, in the intermediate state shown in FIG. 6C, although the first flat part 104a has the highest viewability, the second flat part 104c and the third flat part 104e are blocked by the first panel 101 from being viewed, and hence it is difficult to view the flat parts 104c and 104e. By performing the display control such that an image is displayed only on the first flat part 104a which is easy to be visually recognized as described above, it is possible to save electric power while maintaining viewability.

A state shown in FIG. 6B is the unfolded state in which θa=θb=165° holds. In this state, an image is displayed on the third flat part 104e (FIG. 5B). This is because if an image is displayed on the first flat part 104a in this unfolded state, an angle formed between a line of sight (sight line X) and the optical axis O is so large that viewability is low, i.e. the position of the first flat part 104a is largely away from the camera body 112. On the other hand, as for the third flat part 104e, an angle formed between a line of sight (sight line Y) viewing the screen and the optical axis O is small enough to make viewability high. Therefore, in the unfolded state, by performing the display control such that an image is displayed only on the third flat part 104e, a high viewability is obtained.

The state shown in FIG. 6D is the intermediate state, and there are envisaged a case where the electronic apparatus 100 is used to photograph a subject in a position higher than a line of sight (sight line A), and a case where the same is used to photograph the subject while viewing a screen positioned in the optical axis direction with a line of sight (sight line B). In the intermediate state shown in FIG. 6D, θb>θ4 holds, and hence an image is displayed on the first flat part 104a and the third flat part 104e (see FIG. 5C). No image is displayed on the second flat part 104c. This makes it possible to save electric power while maintaining viewability. Note that it is desirable that the fourth angle θ4 is not smaller than 90° because this prevents the view of the third flat part 104e from being blocked by the other flat part and makes it easy to view the same.

Note that in the state shown in FIG. 6D, in the case where the subject is photographed while viewing a screen with the sight line B, it is also easy to visually recognize the second flat part 104c, and hence an image may be displayed on the second flat part 104c by user's configuration. In this case, the first flat part 104a may be set to a non-display state.

A state shown in FIG. 6E is the intermediate state in which θa=80° and θb=165° hold. In this state, θb>θ3 holds, and hence an image is displayed over the third flat part 104e and the second flat part 104c (see FIG. 5D) in spite of the fact that the display device 130 is in the intermediate state. A state shown in FIG. 6F is the intermediate state in which θa=180° and θb=90° hold. In this state, θa>θ3 holds, and hence an image is displayed over the second flat part 104c and the first flat part 104a in spite of the fact that the display device 130 is in the intermediate state (see FIG. 5E).

Incidentally, in the present embodiment, in whichever of the unfolded state, the intermediate state, and the folded state, the display device 130 may be, in a case where an instruction is input from the user, the CPU 21 controls the display of each display section based on the user's instruction. By giving the priority to the user's instruction, the settings of display are configured to be changeable by user's intention, and it is possible to provide a state of the display device 130 which enables the user to enjoy high viewability thereof. The user can input an instruction for a setting of display e.g. by touching the display screen. By touching a flat part in the non-display state, the user can change the settings of display such that an image is displayed on the touched flat part.

For example, in the intermediate state shown in FIG. 6D, in which θa=10° and θb=90° hold, an image is displayed on the first flat part 104a and the third flat part 104e, and no image is displayed on the second flat part 104c. On the other hand, as shown in FIG. 6G, with respect to the display device 130 existing in a low position, when the display 104 is viewed with a line of sight (sight line C), the second flat part 104c is higher in viewability than the third flat part 104e. Therefore, in the state shown in FIG. 6D, it is possible to shift the second flat part 104c to a state displaying an image by the user touching the same. At this time, if the image remains displayed on the third flat part 104e, the display device 130 is placed in a state displaying the image on all of the flat parts, which increases power consumption.

To prevent this, as shown in FIG. 6G, the CPU 21 performs the display control such that the image ceases to be displayed on the third flat part 104e and is caused to be displayed on the second flat part 104c. This makes it possible to save electric power while maintaining viewability. Note that in the case where the image is displayed on the second flat part 104c, the CPU 21 may perform the display control such that no image is displayed on the first flat part 104a. That is, the display control may be performed such that no image is displayed on the flat parts other than the touched flat part.

Figure 7:
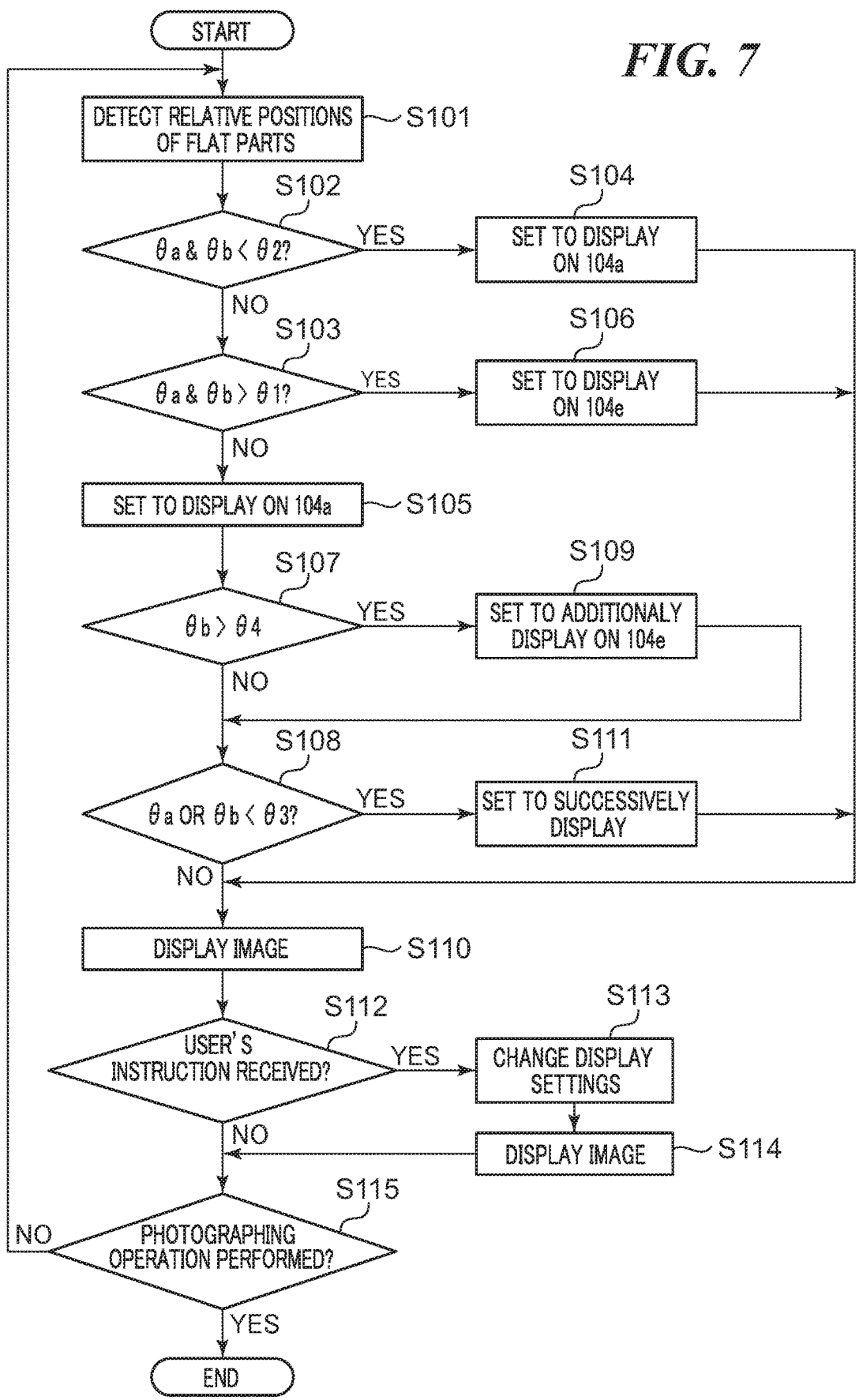
FIG. 7 is a flowchart of a display control process.

FIG. 7 is a flowchart of a display control process. This process is realized by the CPU 21 that executes an associated program stored in the ROM 23 and loaded into the RAM 22. This process is started when the power switch 9 of the electronic apparatus 100 is turned on.

In a step S101, the CPU 21 detects the current relative positions of the first flat part 104a, the second flat part 104c, and the third flat part 104e, based on signals output from the position detection sensor 20. More specifically, in detecting these relative positions, the CPU 21 acquires the angles $\theta a$ and $\theta b$. Note that the CPU 21 continues to acquire the angles $\theta a$ and $\theta b$ based on the output from the position detection sensor 20 on an as-needed basis after the power switch 9 is turned on.

In a step S102, the CPU 21 determines whether or not the angles $\theta a$ and $\theta b$ are both smaller than the second angle $\theta 2$ ($\theta a$, $\theta b < \theta 2$). As a result of the determination, if it is determined that the angles $\theta a$ and $\theta b$ are both smaller than the second angle $\theta 2$, the CPU 21 judges that the display device 130 is in the folded state, and proceeds to a step S104. In the step S104, the CPU 21 makes settings of display such that an image is displayed on the first flat part 104a farthest from the holding portion and that no image is displayed on the second flat parts 104c and the third flat part 104e (see FIGS. 5A and 6A). Then, the CPU 21 proceeds to a step S110. Note that the settings of display are stored in the RAM 22 and can be sequentially updated according to processing performed in each step, as required.

Further, if it is determined in the step S102 that at least one of the angles $\theta a$ and $\theta b$ is not smaller than the second angle $\theta 2$, the CPU 21 proceeds to a step S103. In the step S103, the CPU 21 determines whether or not the angles $\theta a$ and $\theta b$ are both larger than the first angle $\theta 1$ ($\theta a$, $\theta b > \theta 1$). As a result of the determination, if it is determined that the angles $\theta a$ and $\theta b$ are both larger than the first angle $\theta 1$, the CPU 21 judges that the display device 130 is in the unfolded state, and proceeds to a step S106. In the step S106, the CPU 21 makes settings of display such that an image is displayed on the third flat part 104e held at the holding portion and that no image is displayed on the second flat parts 104c and the first flat part 104a (see FIGS. 5B and 6B). Then, the CPU 21 proceeds to the step S110.

If it is determined in the step S103 that at least one of the angles $\theta a$ and $\theta b$ is not larger than the first angle $\theta 1$, the CPU 21 judges that the display device 130 is in the intermediate state, and proceeds to a step S105. In the step S105, the CPU 21 makes settings of display such that no image is displayed on at least one of the flat parts other than the first flat part 104a. In the present embodiment, the CPU 21 makes settings of display such that an image is displayed on the first flat part 104a and that no image is displayed on the second flat parts 104c and the third flat part 104e (see FIGS. 5A and 6C). Then, the CPU 21 proceeds to a step S107.

In the step S107, the CPU 21 determines whether or not an angle formed between the display section held at the holding portion and the display section adjacent to this display section (angle $\theta b$) is larger than the fourth angle $\theta 4$ ($\theta b > \theta 4$). As a result of the determination, if it is determined that the angle $\theta b$ is larger than the fourth angle $\theta 4$, the CPU 21 proceeds to a step S109. In the step S109, the CPU 21 makes setting of display such that the image is also displayed on the third flat part 104e of the display section held at the holding portion. More specifically, in the present embodiment, the CPU 21 makes settings of display such that an image is displayed not only on the first flat part 104a but also on the third flat part 104e (see FIGS. 5C and 6D). Then, the CPU 21 proceeds to a step S108. If it is determined in the step S107 that the angle $\theta b$ is not larger than the fourth angle $\theta 4$, the CPU 21 proceeds directly to the step S108.

In the step S108, the CPU 21 determines whether or not the pairs of the adjacent display sections include one which form an angle larger than the third angle $\theta 3$. As described hereinabove, the angle $\theta a$ is formed between the pair of the display section including the first flat part 104a and the display section including the second flat part 104c, and the angle $\theta b$ is formed between the pair of the display section including the second flat part 104c and the display section including the third flat part 104e. If it is determined that at least one of the angle $\theta a$ and the angle $\theta b$ is larger than the third angle $\theta 3$, the CPU 21 proceeds to a step S111. If it is determined that neither of the angle $\theta a$ and the angle $\theta b$ is larger than the third angle $\theta 3$, the CPU 21 proceeds to the step S110.

In the step S111, the CPU 21 makes settings of display such that an image is displayed over the two flat parts of display sections forming the pair which form the angle larger than the third angle $\theta 3$. For example, in the state shown in FIG. 6E, $\theta b = 165° > \theta 3$ holds, and hence the CPU 21 makes setting of display such that the image is displayed (successively) over the second flat part 104c and the third flat part 104e (see FIG. 5D). On the other hand, in the state shown in FIG. 6F, $\theta a = 180° > \theta 3$ holds, and hence the CPU 21 makes settings of display such that the image is displayed over the first flat part 104a and the second flat part 104c (see FIG. 5E). At this time, the CPU 21 makes the settings of display such that no image is displayed on the third flat part 104e. Note that in a case where $\theta a > \theta 3$ and $\theta b > \theta 3$ both hold, the CPU 21 may make settings of display such that the image is displayed over the all flat parts 104a, 104c, and 104e. In a case where the current settings of display are such that the image is displayed on the third flat part 104e because the step S109 has been executed, the settings may be maintained. Then, the CPU 21 proceeds to the step S110.

Note that in a case where the settings of display are made such that the image is displayed over the two adjacent flat parts in the step S111, the CPU 21 may cause the image to be displayed also on the bending part existing between these flat parts. For example, in a case where the settings of display are such that the image is displayed over the all flat parts 104a, 104c, and 104e because the angles $\theta a$ and $\theta b$ are both larger than the third angle $\theta 3$, the image may be displayed over the whole screen of the display 104 including the first bending part 104b and the second bending part 104d in a continuously connected state.

In the step S110, the CPU 21 causes the image to be displayed on the display 104 according to the current settings of display. Then, in a step S112, the CPU 21 determines whether or not a user's instruction associated with the settings of display has been given e.g. by a touch operation on the display screen. For example, the user can touch the display surface of one of the flat parts in the non-display state, on which an image is desired to be displayed. Then, if it is determined that no user's instruction associated with the settings of display has been given, the CPU 21 proceeds to a step S115. On the other hand, if it is determined that a user's instruction associated with the settings of display has been given, the CPU 21 proceeds to a step S113.

In the step S113, the CPU 21 changes the settings of display according to the user's instruction. For example, the CPU 21 makes settings of display such that an image is displayed on the flat part touched by the user and that no image is displayed on at least one of the flat parts other than the touched flat part. Note that the CPU 21 may make settings of display such that no image is displayed on all flat parts other than the touched flat part. Next, in a step S114, the CPU 21 causes the image to be displayed on the display 104 according to the changed settings of display (see e.g. FIG. 6G). Then, the CPU 21 proceeds to the step S115.

In the step S115, the CPU 21 determines whether or not a photographing operation has been performed. Then, if it is determined that no photographing operation has been performed, the CPU 21 returns to the step S101. On the other hand, if it is determined that a photographing operation has been performed, the CPU 21 terminates the process in FIG. 7.

Figure 8:
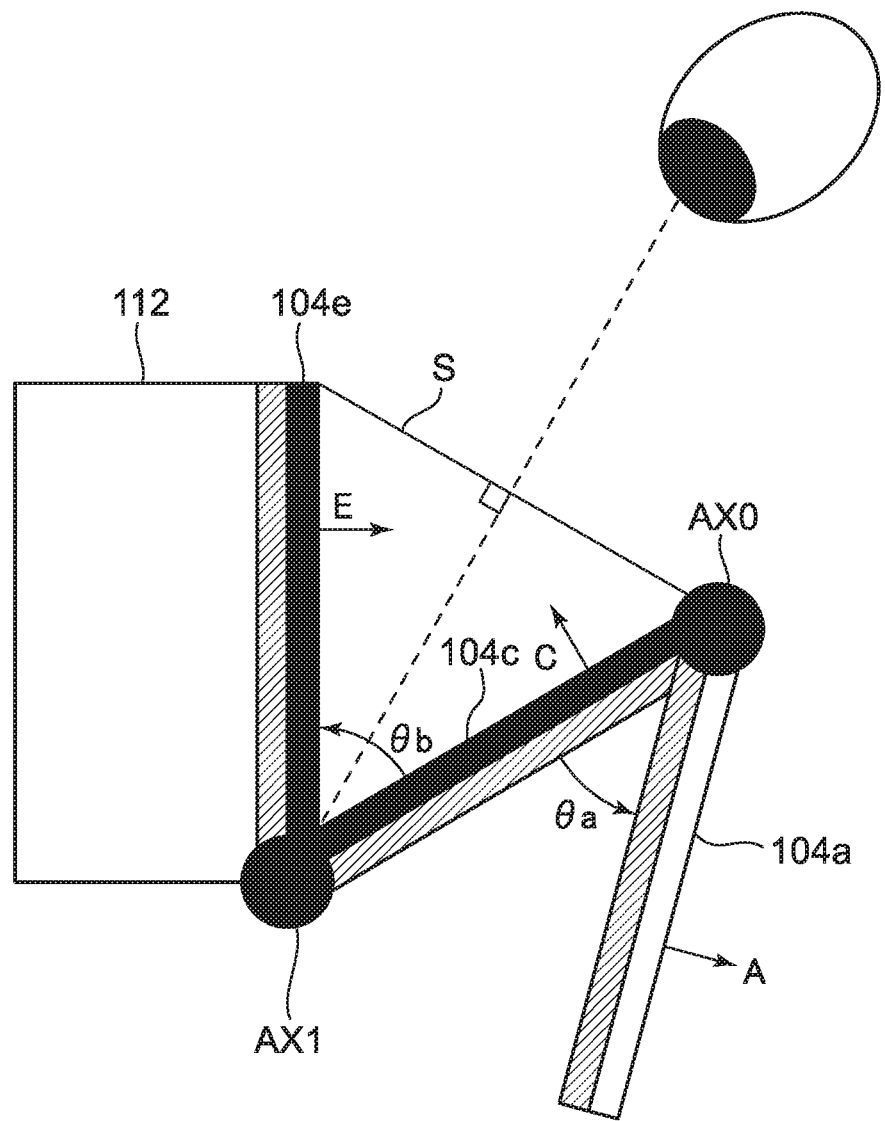
FIG. 8 is a schematic side view of the electronic apparatus.

As described above, it is desirable that the third angle θ3 is not smaller than 60°. The reason for this will be described with reference to FIG. 8. FIG. 8 is a schematic side view of the electronic apparatus 100. In FIG. 8, θb=60° holds. Let it be assumed that the user visually recognizes the second flat part 104c and the third flat part 104e with a line of sight illustrated in FIG. 8. An image which is obtained by adding images on the second flat part 104c and the third flat part 104e projected in the direction of the line of sight is an image visually recognized by the user, and the image is in a range S. Since θb=60° holds, the apparent size of the image obtained by adding the images on the second flat part 104c and the third flat part 104e projected in the range S is equal to the size of an image on one flat part. Therefore, if θb is larger than 60°, an image formed by images successively displayed over the two flat parts 104c and 104e adjacent to each other is larger than an image displayed on one flat part. From the above, by successively displaying images over the two flat parts adjacent to each other, a visually recognized image is made larger in size and viewability thereof is increased.

According to the present embodiment, the display device 130 is configured such that an angle formed between each adjacent ones of the display sections is variable, and the display device 130 can be shifted between the unfolded state, the intermediate state, and the folded state. In the intermediate state of the display device 130, the CPU 21 causes an image to be displayed on a flat part (first flat part 104a) farthest from the holding portion, and not to be displayed on at least one of the other flat parts. Therefore, it is possible to suppress power consumption while achieving both of size reduction of the apparatus and improvement of image viewability.

Further, in the unfolded state of the display device 130, it is possible to cause an image to be displayed on a display section (third flat part 104e) held at the holding portion and no image to be displayed on the other display sections, and hence it is possible to increase viewability by displaying the image on the display section close to the casing.

Further, in the folded state of the display device 130, an image is displayed on the first flat part 104a farthest from the holding portion and no image is displayed on the other flat parts. The display surface of the first flat part 104a can be visually recognized, as viewed from the front of the display surface of the third flat part 104e along the E direction normal thereto. Therefore, it is possible to maintain viewability and reduce power consumption by setting the display section which is difficult to view, to the non-display state.

Further, even when the display device 130 is in the intermediate state, in a case where the pairs of adjacent display sections include one which form an angle larger than the third angle θ3, an image is displayed on the flat parts of the display sections forming the pair. Since an image is displayed over the two flat parts adjacent to each other, viewability is increased.

Further, even when the display device 130 is in the intermediate state, in a case where the angle θb formed between the display section held at the holding portion (the display section including the third flat part 104e) and the display section adjacent to this (the display section including the second flat part 104c) is larger than the fourth angle θ4, an image is also displayed on the third flat part 104e. This makes it possible to reduce power consumption while increasing viewability.

Further, even when the display device 130 is in any of the above-described states, in a case where an instruction is input from a user, the display on each display section is controlled based on the user's instruction, and hence it is possible to provide a state of the display device 130 in which the user can enjoy high viewability thereof.

Next, a description will be given of a second embodiment of the present invention. An electronic apparatus according to the second embodiment is equipped with a display device having four flat parts. The electronic apparatus according to the second embodiment has the same construction as the first embodiment, in the other respects.

FIG. 9 is a schematic side view of the electronic apparatus, denoted by reference numeral 200, according to the present embodiment. The electronic apparatus 200 includes the camera body 112 and a display device 230. The display device 230 includes a display 204. The display 204 includes a fourth flat part 104g in addition to the first flat part 104a, the second flat part 104c, and the third flat part 104e. The display device 230 includes a fourth panel 106 having a rectangular flat plate shape, in addition to the first panel 101, the second panel 102, and the third panel 105. A second surface of the fourth panel 106 is fixed to the camera body 112 by a double-sided tape, not shown. Therefore, the fourth flat part 104g is the flat part of the display section held at the holding portion. The first flat part 104a is the flat part farthest from the holding portion.

The direction normal to the display surface of the fourth flat part 104g (+Z direction) is indicated by G. The third panel 105 has hinge portions 105d arranged at opposite ends on one side opposite to the hinge portions 105a. Further, the fourth panel 106 has hinge portions 106a arranged at opposite ends of one side parallel to the X axis. The hinge portions 105a and the hinge portions 106a are rotatably connected about a rotational axis AX2 which is parallel to the X axis. With this, the third panel 105 and the fourth panel 106 can be rotated about the rotational axis AX2 relative to each other. The hinge portions 105a and the hinge portions 106a are collectively referred to as the "third hinge". A rotational angle of the display section including the third panel 105 with respect to the display section including the fourth panel 106 is represented by θc in FIG. 9. In the illustrated example in FIG. 9, θa=θb=θc=25° holds. The same bending part as the first bending part 104b and the second bending part 104d is arranged between the third flat part 104e and the fourth flat part 104g.

In the present embodiment, a state in which all of the angles θa, θb, and θc are larger than the first angle θ1 is defined as the "unfolded state" of the display device 230. A state in which all of the angles θa, θb, and θc are smaller than the second angle θ2 is defined as the "folded state" of the display device 230. A state which corresponds neither to the folded state nor to the unfolded state is defined as the "intermediate state". The definition and the exemplified values of each angle θ are the same as those of the first embodiment.

In the first embodiment, an image is displayed on the first flat part 104a in the folded state. However, in the present embodiment, in the folded state shown in FIG. 9, in which θa=θb=θc=25° holds, all of the flat parts are low in viewability. Therefore, an image is displayed on none of the flat parts. That is, a condition that the display surface of the flat part farthest from the holding portion (the first flat part 104a) can be visually recognized, as viewed from the front of the display surface of the fourth flat part 104g along the G direction normal thereto may be set as a condition required to be satisfied for display on the first flat part 104a. In the present embodiment, this condition is applied and is not satisfied in the folded state of the display device 230. Therefore, the CPU 21 controls the display device 130 such that no image is displayed on the first flat part 104a in the folded state.

Figure 10:
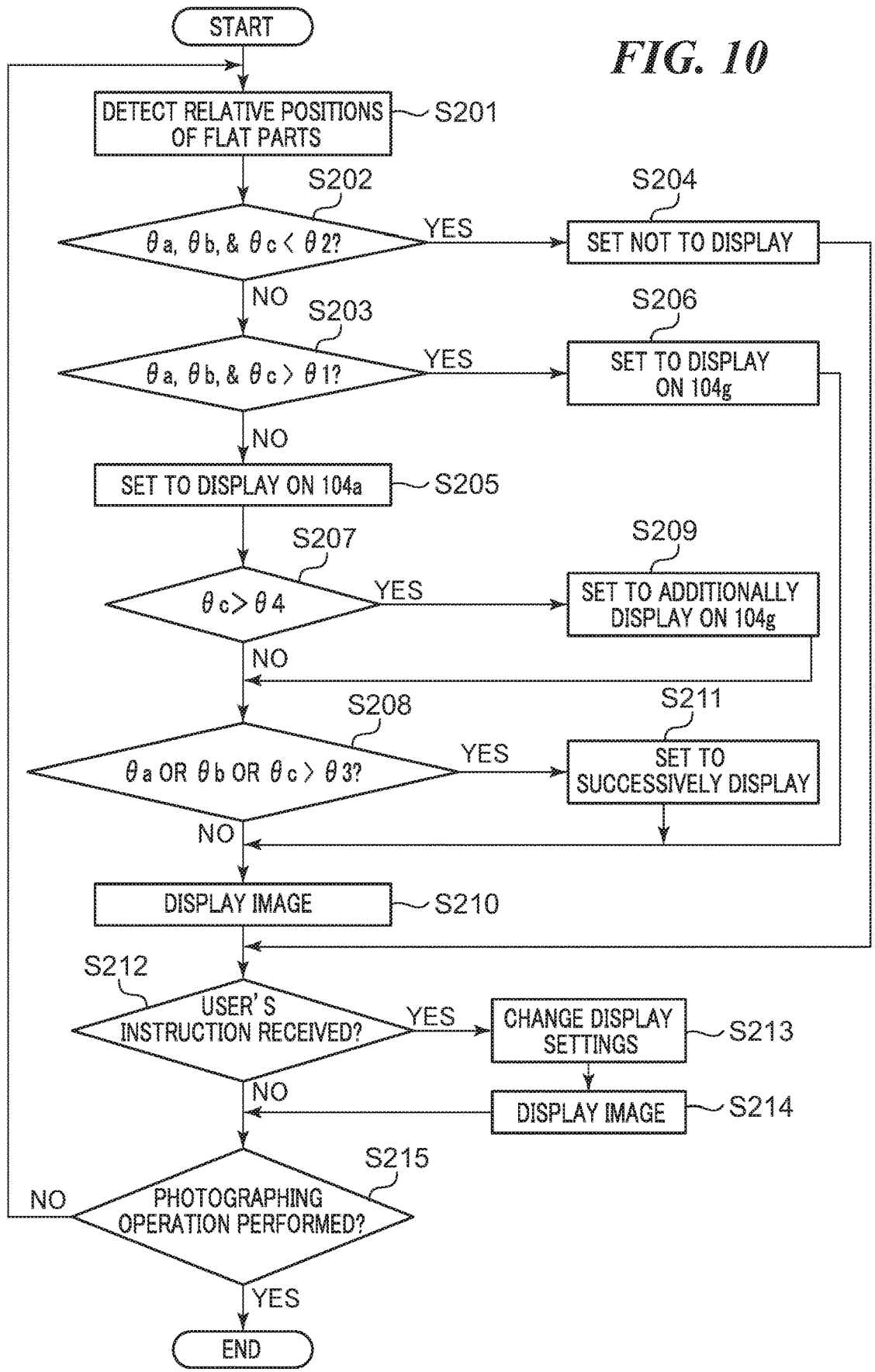
FIG. 10 is a flowchart of a display control process.
Figure 11A:
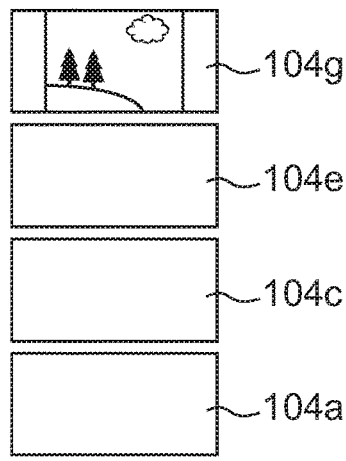
FIGS. 11A to 11F are schematic views each showing an example of display on flat parts.
Figure 11D:
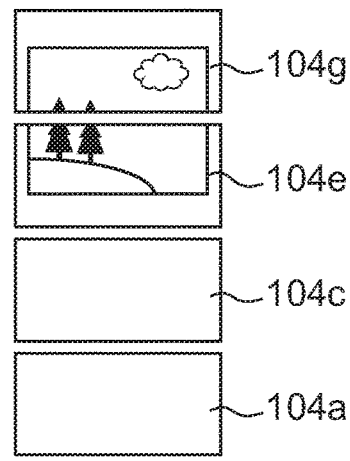
Figure 11B:
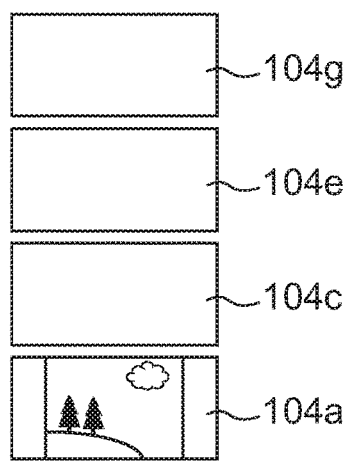
Figure 11E:
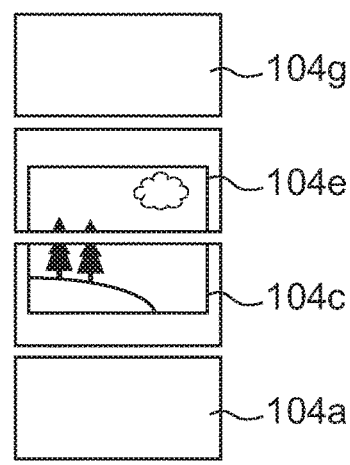
Figure 11C:
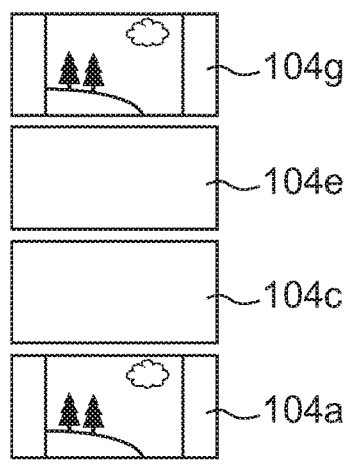
Figure 11F:
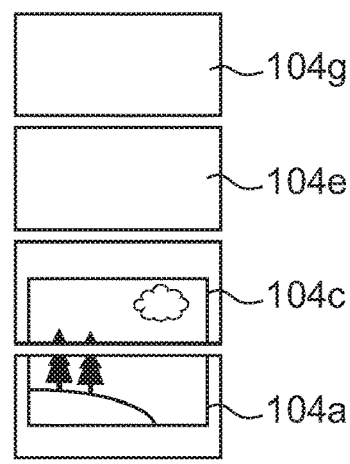

The display control will be described with reference to FIGS. 10 and 11A to 11F. FIG. 10 is a flowchart of a display control process. The execution entity, the execution conditions, and the start conditions of this process are the same as those of the first embodiment (see FIG. 7). FIGS. 11A to 11F are schematic views each showing an example of display on the flat parts 104a, 104c, 104e, and 104g.

In a step S201, the CPU 21 executes the same processing as in the step S101 in FIG. 7. In a step S202, the CPU 21 determines whether or not all of the angles θa, θb, and θc are smaller than the second angle θ2 (θa, θb, θc<θ2). As a result of the determination, if it is determined that all of the angles θa, θb, and θc are smaller than the second angle θ2, the CPU 21 judges that the display device 230 is in the folded state, and proceeds to a step S204.

In the step S204, the CPU 21 makes settings of display such that no image is displayed on the flat parts. This is because, as shown in FIG. 9, in the folded state, the first flat part 104a, the second flat parts 104c, the third flat part 104e, and the fourth flat part 104g are all blocked by the respective reverse sides of the adjacent display sections from being viewed, and hence are low in viewability. Particularly, no image is displayed on the first flat part 104a, either, because the display surface of the first flat part 104a cannot be visually recognized, as viewed from the front of the display surface of the fourth flat part 104g along the G direction normal thereto. After execution of the step S204, the CPU 21 proceeds to a step S212. Note that the settings of display are stored in the RAM 22 and can be sequentially updated according to processing performed in each step, as required.

If it is determined in the step S202 that at least one of the angles θa, θb, and θc is not smaller than the second angle θ2, the CPU 21 proceeds to a step S203. In the step S203, the CPU 21 determines whether or not all of the angles θa, θb, and θc are larger than the first angle θ1 (θa, θb, θc>θ1). As a result of the determination, if it is determined that all of the angles θa, θb, and θc are larger than the first angle θ1, the CPU 21 judges that the display device 230 is in the unfolded state, and proceeds to a step S206. In the step S206, the CPU 21 makes settings of display such that an image is displayed on the fourth flat part 104g of the display section held at the holding portion and that no image is displayed on the other flat parts (see FIG. 11A). Then, the CPU 21 proceeds to a step S210.

If it is determined in the step S203 that at least one of the angles θa, θb, and θc is not larger than the first angle θ1, the CPU 21 judges that the display device 230 is in the intermediate state, and proceeds to a step S205. In the step S205, the CPU 21 makes settings of display such that an image is displayed on the first flat part 104a farthest from the holding portion and that no image is displayed on at least one of the flat parts other than the first flat part 104a. In the present embodiment, the CPU 21 makes settings of display such that an image is displayed on the first flat part 104a and that no image is displayed on the flat parts 104c, 104e, and 104g (see FIG. 11B). Then, the CPU 21 proceeds to a step S207.

In the step S207, the CPU 21 determines whether or not an angle (angle θc) formed between the display section held at the holding portion and the display section adjacent to this display section is larger than the fourth angle θ4 (θc>θ4). As a result of the determination, if it is determined that the angle θc is larger than the fourth angle θ4, the CPU 21 proceeds to a step S209. In the step S209, the CPU 21 makes settings of display such that an image is also displayed on the flat part of the display section held at the holding portion. That is, in the present embodiment, the CPU 21 makes settings of display such that an image is displayed not only on the first flat part 104a but also on the fourth flat part 104g (see FIG. 11C). Then, the CPU 21 proceeds to a step S208. If it is determined in the step S207 that the angle θc is not larger than the fourth angle θ4, the CPU 21 directly proceeds to the step S208.

In the step S208, the CPU 21 determines whether or not the pairs of adjacent display sections include one which form an angle larger than the third angle θ3. In the present embodiment, the angle θa is formed between the pair of the display section including the first flat part 104a and the display section including the second part 104c and the angle θb is formed between the pair of the display section including the second flat part 104c and the display section including the third flat part 104e. The angle θc is formed between the pair of the display section including the third flat part 104e and t the display section including the fourth flat part 104g. If it is determined that at least one of the angles θa, θb, and θc is larger than the third angle θ3, the CPU 21 proceeds to a step S211. If it is determined that none of the angles θa, θb, and θc are larger than the third angle θ3, the CPU 21 proceeds to the step S210.

In the step S211, the CPU 21 executes the same processing as in the step S111 in FIG. 7. For example, in a case where θc>θ3 holds, the CPU 21 makes settings of display such that the image is displayed over the third flat part 104e and the fourth flat part 104g (see FIG. 11D). In a case where θb>θ3 holds, the CPU 21 makes settings of display such that the image is displayed over the second flat part 104c and the third flat part 104e (see FIG. 11E). In a case where θa>θ3 holds, the CPU 21 makes settings of display such that the image is displayed over the first flat part 104a and the second flat part 104c (see FIG. 11F). Note that in a case where the current settings of display are such that the image is displayed on the fourth flat part 104g because the step S209 has been executed, the settings may be maintained.

Note that in a case where θc>θ3 and θb>θ3 hold at the same time, the CPU 21 may make settings of display such that the image is displayed over the flat parts 104c, 104e, and 104g. Further, in a case where θb>θ3 and θa>θ3 hold at the same time, the CPU 21 may make settings of display such that the image is displayed over the flat parts 104a, 104c, and 104e. Further, in a case where θa>θ3 and θc>θ3 hold at the same time, the CPU 21 may make settings of display such that an image is displayed over all of the flat parts. Then, the CPU 21 proceeds to the step S210. Note that in a case where an image is displayed over two flat parts adjacent to each other, the CPU 21 may cause the image to be also displayed on the bending part arranged between the two adjacent flat parts.

The step S210, and the step S212 to a step S215 are the same as the steps S110, and S112 to S115 in FIG. 7. If it is determined in the step S215 that no photographing operation has been performed, the CPU 21 returns to the step S201. On the other hand, if it is determined in the step S215 that a photographing operation has been performed, the CPU 21 terminates the process in FIG. 10.

Incidentally, in the folded state shown in FIG. 9, the first flat part 104a of the display section farthest from the holding portion does not appear on the outside to be viewed in the −Z direction, and hence no image is displayed on the first flat part 104a. On the other hand, in the state shown in FIG. 9, the first panel 101 to which the first flat part 104a is attached functions as a protector for protecting the screen from an external force in the −Z direction.

According to the present embodiment, it is possible to obtain the same advantageous effects as those provided by the first embodiment in reducing power consumption while achieving both of size reduction of the apparatus and improvement of viewability.

Further, in the folded state, since no image is displayed on the first flat part 104a, either, which does not appear on the outside to be viewed in the −Z direction, it is possible to increase the effect of reduction of power consumption.

As described above, in applying the present invention, the number of flat parts (display sections) for displaying an image is not limited, but is only required to be provided in plurality. Therefore, the present invention can be applied even when the number of flat parts is five or more, and further, can be applied even when the number of flat parts is two.

Next, a description will be given of a third embodiment of the present invention. An electronic apparatus according to the third embodiment is equipped with a display device having two flat parts (display sections) for displaying an image. The electronic apparatus according to the third embodiment has the same construction as the second embodiment, in the other respects.

Figure 12:
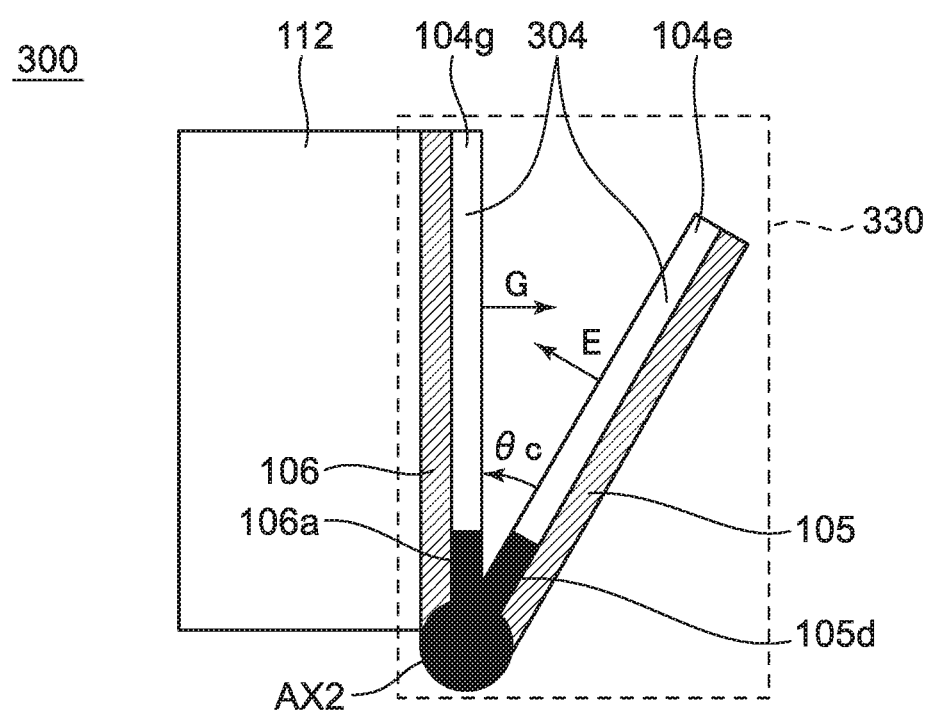
FIG. 12 is a schematic side view of an electronic apparatus according to a third embodiment of the present invention.

FIG. 12 is a schematic side view of the electronic apparatus, denoted by reference numeral 300, according to the present embodiment. The electronic apparatus 300 includes the camera body 112 and a display device 330. The display device 330 includes a display 304. The display 304 includes the third flat part 104e and the fourth flat part 104g. The display device 330 includes the third panel 105 and the fourth panel 106. The second surface of the fourth panel 106 is fixed to the camera body 112 by a double-sided tape, not shown. Therefore, the display section including the fourth flat part 104g is the display section held at the holding portion. The third flat part 104e is the flat part farthest from the holding portion.

In the present embodiment, a state in which the angle θc is larger than the first angle θ1 is defined as the "unfolded state" of the display device 330. Further, a state in which the angle θc is smaller than the second angle θ2 is defined as the "folded state" of the display device 330. A state which corresponds neither to the folded state nor to the unfolded state is defined as the "intermediate state". The definition and the exemplified values of each angle θ are the same as those of the second embodiment. In FIG. 12, the angle θc is smaller than the second angle θ2, and hence the display device 330 is in the folded state.

In the present embodiment, in the folded state shown in FIG. 12, the two flat parts are both low in viewability. Therefore, an image is displayed on neither of the flat parts. In other words, a condition that the display surface of the third flat part 104e farthest from the holding portion can be visually recognized, as viewed from the front of the display surface of the fourth flat part 104g along the G direction normal thereto, may be set as a condition required to be satisfied for display on the third flat part 104e. In the present embodiment, this condition is applied and is not satisfied in the folded state of the display device 330. Therefore, the CPU 21 controls the display device 130 such that no image is displayed on the third flat part 104e in the folded state. This is because in the folded state of the display device 130, the display surface of the third flat part 104e is blocked by the rear surface of the display section including the third flat part 104e from being viewed and is low in viewability.

Figure 13:
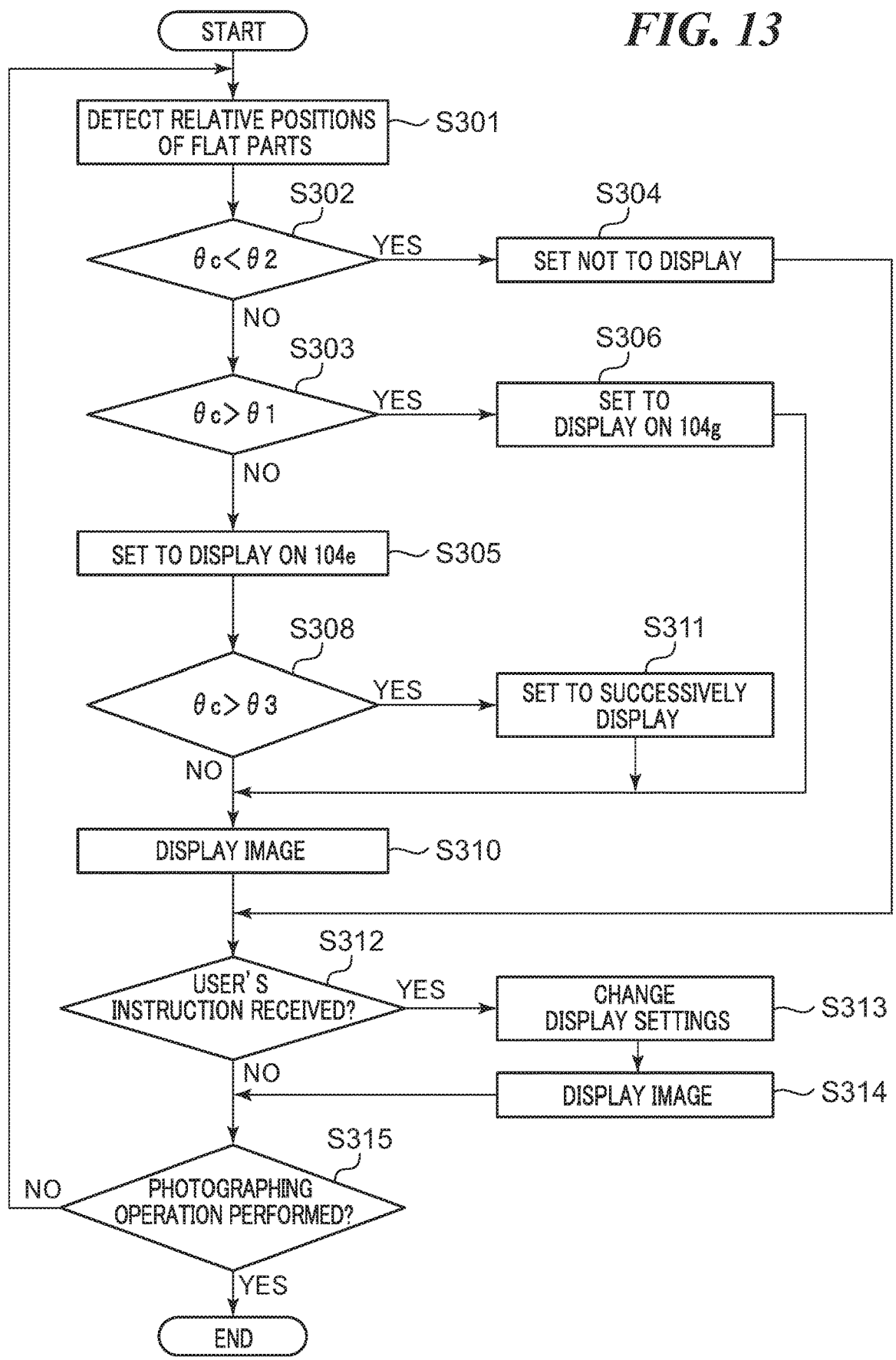
FIG. 13 is a flowchart of a display control process.

FIG. 13 is a flowchart of a display control process. The execution entity, the execution conditions, and the start conditions of this process are the same as those of the second embodiment (see FIG. 10).

In a step S301, the CPU 21 executes the same processing as in the step S201 in FIG. 10. In a step S302, the CPU 21 determines whether or not the angle θc is smaller than the second angle θ2 (θc<θ2). As a result of the determination, if it is determined that the angle θc is smaller than the second angle θ2, the CPU 21 judges that the display device 330 is in the folded state, and proceeds to a step S304.

In the step S304, the CPU 21 executes the same processing as in the step S204 in FIG. 10 and proceeds to a step S312. Note that the settings of display are stored in the RAM 22 and can be sequentially updated according to processing performed in each step, as required.

If it is determined in the step S302 that the angle θc is not smaller than the second angle θ2, the CPU 21 proceeds to a step S303. In the step S303, the CPU 21 determines whether or not the angle θc is larger than the first angle θ1 (θc>θ1). As a result of the determination, if it is determined that the angle θc is larger than the first angle θ1, the CPU 21 judges that the display device 330 is in the unfolded state and proceeds to a step S306. In the step S306, the CPU 21 makes settings of display such that an image is displayed on the fourth flat part 104g held at the holding portion and that no image is displayed on the other flat part (the third flat part 104e). Then, the CPU 21 proceeds to a step S310.

If it is determined in the step S303 that the angle θc is not larger than the first angle θ1, the CPU 21 judges that the display device 330 is in the intermediate state and proceeds to a step S305. In the step S305, the CPU 21 makes settings of display such that an image is displayed on the third flat part 104e farthest from the holding portion and that no image is displayed on the other flat part (fourth flat part 104g). Then, the CPU 21 proceeds to a step S308.

In the step S308, the CPU 21 determines whether or not the angle θc formed between the pair of the display section including the third flat part 104e and the display section including the fourth flat part 104g, adjacent to each other, is larger than the third angle θ3. If it is determined that the angle θc is larger than the third angle θ3, the CPU 21 proceeds to a step S311. If it is determined that the angle θc is not larger than the third angle θ3, the CPU 21 proceeds to the step S310.

In the step S311, the CPU 21 executes the same processing as in the step S211 in FIG. 10. Therefore, in a case where θc>θ3 holds, the CPU 21 makes settings of display such that the image is displayed over the third flat part 104e and the fourth flat part 104g. Then, the CPU 21 proceeds to the step S310.

The step S310, and the step S312 to a step S315 are the same as the steps S210, and S212 to S215 in FIG. 10. If it is determined in the step S315 that no photographing operation has been performed, the CPU 21 returns to the step S301. On the other hand, if it is determined that a photographing operation has been performed, the CPU 21 terminates the process in FIG. 13.

According to the present embodiment, it is possible to obtain the same advantageous effects as those provided by the second embodiment in reducing power consumption while achieving both of size reduction of the apparatus and improvement of viewability.

Further, in the folded state, since no image is displayed on the third flat part 104e, either, which does not appear on the outside to be viewed in the −Z direction, it is possible to increase the effect of reduction of power consumption.

Figure 14:
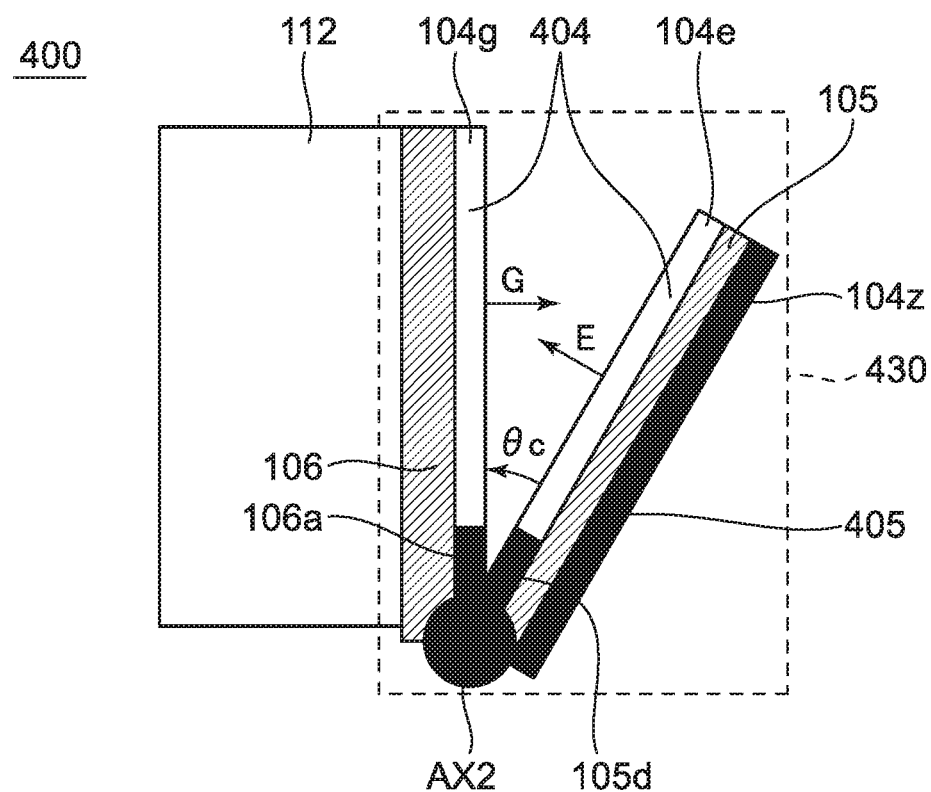
FIG. 14 is a schematic side view of an electronic apparatus according to a fourth embodiment of the present invention.

Next, a description will be given of a fourth embodiment of the present invention. FIG. 14 is a schematic side view of an electronic apparatus 400 according to the fourth embodiment. The electronic apparatus 400 includes the camera body 112 and a display device 430. The display device 430 includes a display 404 and a display 405. The display device 430 includes the third panel 103 and the fourth panel 106 as the panels. The display 404 includes the third flat part 104e and the fourth flat part 104g, and the display 405 includes a fifth flat part 104z. The fourth embodiment differs from the third embodiment in that the third panel 105 has the fifth flat part 104z on an opposite side to the third flat part 104e. The second surface of the fourth panel 106 is fixed to the camera body 112 by a double-sided tape, not shown. Therefore, the fourth flat part 104g is the flat part of the display section held at the holding portion. The fifth flat part 104z is the flat part farthest from the holding portion.

In the present embodiment, a state in which the angle θc is larger than the first angle θ1 is defined as the "unfolded state" of the display device 430. Further, a state in which the angle θc is smaller than the second angle θ2 is defined as the "folded state" of the display device 430. A state which corresponds neither to the folded state nor to the unfolded state is defined as the "intermediate state". The definition and the exemplified values of each angle θ are the same as those of the third embodiment. In FIG. 14, the angle θc is smaller than the second angle θ2 and hence the display device 430 is in the folded state.

In the folded state, an image is displayed only on the fifth flat part 104z. A condition that the display surface of the fifth flat part 104z farthest from the holding portion can be visually recognized, as viewed from the front of the display surface of the fourth flat part 104g along the G direction normal thereto, may be set as a condition required to be satisfied for display on the fifth flat part 104z. In the present embodiment, this condition is applied and is satisfied in the folded state of the display device 430. Therefore, differently from the third embodiment, the CPU 21 makes settings of display such that an image is displayed on the fifth flat part 104z farthest from the holding portion and that no image is displayed on the third flat part 104e and the fourth flat part 104g in the folded state. The image is displayed on the fifth flat part 104z because the fifth flat part 104z appears on the outside, as viewed in the −Z direction, and is high in viewability.

In the unfolded state of the display device 430, an image is displayed on the fourth flat part 104g. In the intermediate state of the same, an image is displayed on the third flat part 104e. In a case where θc>θ4 holds, an image is displayed on the fourth flat part 104g even when the display device 430 is in the intermediate state. In a case where θc>θ3 holds, the image is displayed over the third flat part 104e and the fourth flat part 104g even when the display device 430 is in the intermediate state. Note that the display control for each flat part based on a user's instruction is applied.

According to the present embodiment, it is possible to obtain the same advantageous effects as those provided by the third embodiment in reducing power consumption while achieving both of size reduction of the apparatus and improvement of viewability.

Figure 15:
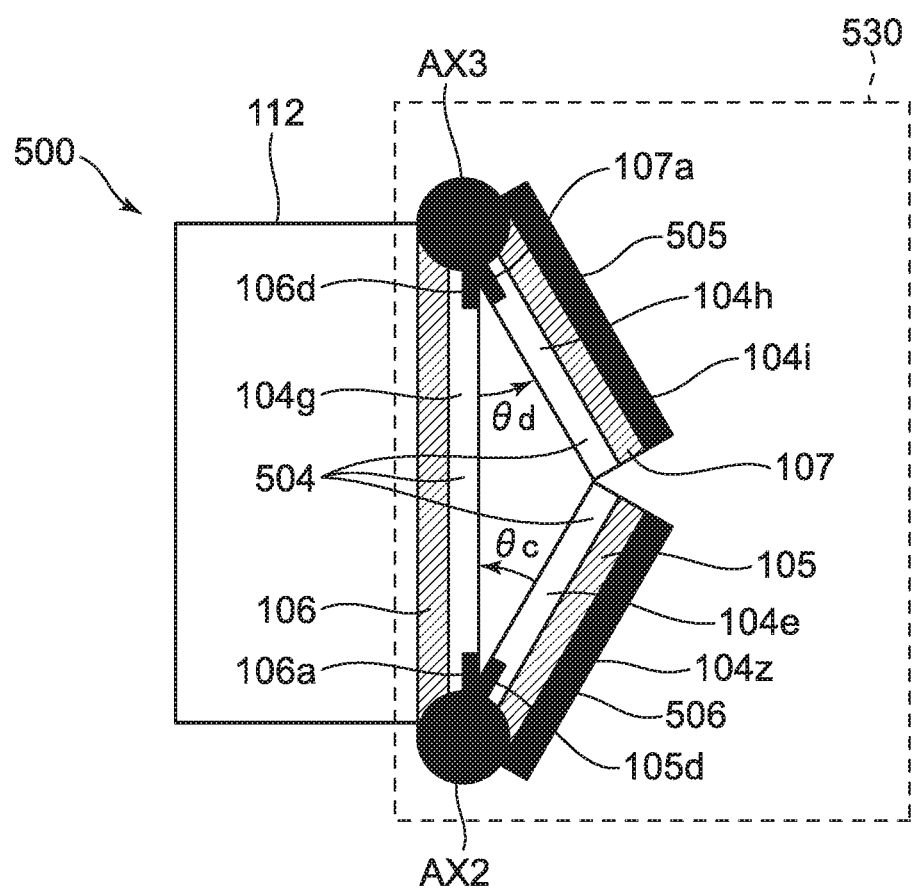
FIG. 15 is a schematic side view of an electronic apparatus according to a fifth embodiment of the present invention.

Next, a description will be given of a fifth embodiment of the present invention. FIG. 15 is a schematic side view of an electronic apparatus 500 according to the fifth embodiment. The electronic apparatus 500 includes the camera body 112 and a display device 530. The display device 530 includes displays 504, 505, and 506. In the present embodiment, a fifth panel 107 is added to the construction of the fourth embodiment. Further, the electronic apparatus 500 differs from the electronic apparatus 400 in that the length of the third panel 105 of the display device 430 from the rotational axis AX2 to a free end thereof is reduced.

The fourth panel 106 has hinge portions 106d arranged at opposite ends on one side opposite to the hinge portions 106a. Further, the fifth panel 107 has hinge portions 107a at opposite ends of one side parallel to the X axis. The hinge portions 107a and the hinge portions 106d are rotatably connected about a rotational axis AX3 which is parallel to the X axis. With this, the fourth panel 106 and the fifth panel 107 can be rotated about the rotational axis AX3 relative to each other. The hinge portions 107a and the hinge portions 106d are collectively referred to as the "fourth hinge". A rotational angle of a display section including the fifth panel 107 with respect to the display section including the fourth panel 106 is represented by θd in FIG. 15, and in the illustrated example in FIG. 15, θc=θd=25° holds.

The display 504 includes the third flat part 104e, the fourth flat part 104g, a sixth flat part 104h, and bending parts, not shown, arranged between the flat parts. Further, the display 505 includes a seventh flat part 104i, and the display 506 includes the fifth flat part 104z. The second surface of the fourth panel 106 is fixed to the camera body 112 by a double-sided tape, not shown. Therefore, the fourth flat part 104g is the flat part of the display section held at the holding portion. The fifth flat part 104z and the seventh flat part 104i are flat parts farthest from the holding portion.

In the present embodiment, a state in which the angles θc and θd are both larger than the first angle θ1 is defined as the "unfolded state" of the display device 530. Further, a state in which the angles θc and θd are both smaller than the second angle θ2 is defined as the "folded state" of the display device 530. A state which corresponds neither to the folded state nor to the unfolded state is defined as the "intermediate state". The definition and the exemplified values of each angle θ are the same as those of the fourth embodiment. In FIG. 15, the angles θc and θd are both smaller than the second angle θ2, and hence the display device 530 is in the folded state.

In the folded state, an image is displayed only on the fifth flat part 104z and the seventh flat part 104i farthest from the holding portion. This is because although the flat parts 104e, 104g, and 104h are blocked by the third panel 105 and the fifth panel 107 from being viewed, and are low in viewability, the flat parts 104z and 104i appear on the outside even when the display device 530 is in the folded state and are high in viewability.

In the unfolded state of the display device 530, an image is displayed on the fourth flat part 104g. In the intermediate state, the CPU 21 may perform the display control by regarding the relationship between the fourth panel 106 and the fifth panel 107 as identical to the relationship between the fourth panel 106 and the third panel 105 in the fourth embodiment (see FIG. 14). Further, the CPU 21 may perform the display control by regarding the relationship between the fourth panel 106 and the third panel 105 as identical to the relationship between the fourth panel 106 and the third panel 105 in the fourth embodiment (see FIG. 14).

Alternatively, differently from the other embodiments, the CPU 21 may cause an image to be displayed only on the flat parts 104z and 104i in a case where the angles θc and θd<90° holds, and may cause an image to be displayed only on the fourth flat part 104g in a case where the angles θc and θd≤90° holds. However, the display control for each flat pars based on a user's instruction is applied.

According to the present embodiment, it is possible to obtain the same advantageous effects as those provided by the fourth embodiment in reducing power consumption while achieving both of size reduction of the apparatus and improvement of viewability.

Note that in the above-described embodiments, the description is given of the case where the axes of the respective hinges for rotating the panels are substantially parallel to each other. However, the same display control can be applied to a display device in which the axes of the respective hinges cross each other.

Further, although in the above-described embodiments, the description is given of the display devices formed by connecting the plurality of independent panels, the present invention is not limited to them. For example, the present invention may be applied to a display device (so-called flexible display) formed by an element having flexibility, such as an organic electroluminescence (organic EL), without being provided with connection portions. In this case, the display device is only required to be configured such that the display area (display section) of the flexible display is divided into a plurality of areas (display sections), and that the display control for the divided display areas is performed by making the divided display areas correspondent to the panels in the above-described embodiments.

The present invention can be applied to an electronic apparatus having the display function, and the display function is not limited to the incorporated one, but may be realized by a display device which is removably mounted thereon. Therefore, the electronic apparatus may be an image pickup apparatus having the image pickup function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-137811 filed Jul. 23, 2018, which is hereby incorporated by reference herein in its entirety.

What is claimed is:

1. An electronic apparatus comprising:
   a casing comprising an image pickup section that picks up an image of a subject;
   a display device held on the casing at a holding position and including a plurality of display sections each of which is capable of independently displaying an image; and
   at least one processor or circuit configured to perform the operations of the following unit:
   a control unit configured to control display on the display device,
   wherein the display device is configured such that an angle formed between each adjacent ones of the display sections is variable,
   wherein the plurality of display sections include (1) a first display section farthest from the holding position and (2) a second display section including (a) a display section held on the casing at the holding position and (b) at least one display section making a variable angle with respect to the casing,
   wherein possible states of the display device include a first state in which all of angles each formed between adjacent ones of the plurality of display sections are larger than a first angle, a second state in which all of the angles each formed between the adjacent ones of the plurality of display sections are smaller than a second angle which is smaller than the first angle, and a third state in which the display device is neither in the first state nor in the second state,
   wherein the first display section is connected to the casing via the at least one display section of the second display section,
   wherein when the display device is in the first state, the control unit causes an image to be displayed on the first display section and the second display section, and
   wherein in a state where the display device is changed from the first state to the third state, the control unit causes an image to be displayed on the first display section and no image to be displayed on the second display section.

2. The electronic apparatus according to claim 1, wherein the casing comprises a third display section, and wherein in a case where the display device is in the second state, and a display surface of the first display section can be visually recognized, as viewed from the front of a display surface of the third display section held on the casing along a direction normal to the display surface of the third display section held on the casing, the control unit causes an image to be displayed on the first display section, and causes no image to be displayed on any display section of the second display section.

3. The electronic apparatus according to claim 1, wherein the casing comprises a third display section, and
wherein in a case where the display device is in the second state and a display surface of the first display section cannot be visually recognized, as viewed from the front of a display surface of the third display section held on the casing along a direction normal to the display surface of the third display section held on the casing, the control unit causes no image to be displayed on any of the plurality of display sections.

4. The electronic apparatus according to claim 1, wherein even when the display device is in the third state, in a case where pairs of adjacent ones of the plurality of display sections include a pair of display sections which form an angle larger than a third angle, the control unit causes an image to be displayed on the display sections forming the pair.

5. The electronic apparatus according to claim 1, wherein the casing comprises a third display section, and
wherein even when the display device is in the third state, in a case where an angle formed between the third display section held on the casing and a display section adjacent to the third display section held on the casing is larger than a fourth angle, the control unit additionally causes an image to be also displayed on the display section held on the casing.

6. The electronic apparatus according to claim 1, wherein even when the display device is in any of the first, second, and third states, in a case where an instruction from a user is input, the control unit controls the display on the plurality of display sections based on the user's instruction.

7. The electronic apparatus according to claim 1, wherein in the display device, each adjacent ones of the plurality of display sections are connected such that the display sections are rotatable relative to each other.

8. The electronic apparatus according to claim 1, wherein the at least one processor or circuit is configured to perform the operations of the following unit:
a detection unit configured to detect an angle formed between each adjacent ones of the plurality of display sections.

9. The electronic apparatus according to claim 1, wherein the casing comprises a third display section, and
wherein a direction normal to a display surface of the third display section held on the casing is substantially parallel to an image pickup optical axis of the image pickup section.

10. A method of controlling an electronic apparatus including (a) a casing comprising an image pickup section that picks up an image of a subject, and (b) a display device held on the casing at a holding position and including a plurality of display sections each of which is capable of independently displaying an image, wherein the display device is configured such that an angle formed between each adjacent ones of the plurality of display sections is variable, wherein the plurality of display sections include (1) a first display section farthest from the holding position and (2) a second display section including (i) a display section held on the casing at the holding position and (ii) at least one display section making a variable angle with respect to the casing, and wherein possible states of the display device include a first state in which all of angles each formed between adjacent ones of the plurality of display sections are larger than a first angle, a second state in which all of the angles each formed between the adjacent ones of the plurality of display sections are smaller than a second angle which is smaller than the first angle, and a third state in which the display device is neither in the first state nor in the second state, wherein the first display section is connected to the casing via the at least one display section of the second display section, the method comprising:
when the display device is in the first state, causing an image to be displayed on the first display section and the second display section, and in a state where the display device is changed from the first state to the third state, causing an image to be displayed on the first display section and no image to be displayed on the second display section.

11. A non-transitory computer-readable storage medium storing a computer-executable program for executing a method of controlling an electronic apparatus including (a) a casing comprising an image pickup section that picks up an image of a subject, and (b) a display device held on the casing at a holding position and including a plurality of display sections each of which is capable of independently displaying an image, wherein the display device is configured such that an angle formed between each adjacent ones of the plurality of display sections is variable, wherein the plurality of display sections include (1) a first display section farthest from the holding position and (2) a second display section including (i) a display section held on the casing at the holding position and (ii) at least one display section making a variable angle with respect to the casing, and wherein possible states of the display device include a first state in which all of angles each formed between adjacent ones of the plurality of display sections are larger than a first angle, a second state in which all of the angles each formed between the adjacent ones of the plurality of display sections are smaller than a second angle which is smaller than the first angle, and a third state in which the display device is neither in the first state nor in the second state, wherein the first display section is connected to the casing via the at least one display section of the second display section, and wherein the method comprises:
when the display device is in the first state, causing an image to be displayed on the first display section and the second display section, and in a state where the display device is changed from the first state to the third state, causing an image to be displayed on the first display section and no image to be displayed on the second display section.

* * * * *